(12) United States Patent
Yuan et al.

(10) Patent No.: US 12,438,672 B2
(45) Date of Patent: Oct. 7, 2025

(54) SCHEDULING REFERENCE SIGNALS FOR MULTIPLE CARRIERS

(71) Applicant: QUALCOMM Incorporated, San Diego, CA (US)

(72) Inventors: Fang Yuan, Beijing (CN); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 517 days.

(21) Appl. No.: 17/793,354

(22) PCT Filed: Jan. 23, 2020

(86) PCT No.: PCT/CN2020/074003
§ 371 (c)(1),
(2) Date: Jul. 15, 2022

(87) PCT Pub. No.: WO2021/147088
PCT Pub. Date: Jul. 29, 2021

(65) Prior Publication Data
US 2023/0060481 A1    Mar. 2, 2023

(51) Int. Cl.
*H04L 5/00* (2006.01)
(52) U.S. Cl.
CPC ............ *H04L 5/0053* (2013.01); *H04L 5/001* (2013.01); *H04L 5/005* (2013.01)
(58) Field of Classification Search
CPC ........ H04L 5/0053; H04L 5/001; H04L 5/005
See application file for complete search history.

(56) References Cited

U.S. PATENT DOCUMENTS

| | | | |
|---|---|---|---|
| 2017/0302419 A1 | 10/2017 | Liu et al. | |
| 2018/0115965 A1 | 4/2018 | Takeda et al. | |

FOREIGN PATENT DOCUMENTS

| | | |
|---|---|---|
| CN | 107432018 A | 12/2017 |
| EP | 2536240 A1 | 12/2012 |
| WO | 2011155361 A1 | 12/2011 |
| WO | 2011157237 A1 | 12/2011 |

(Continued)

OTHER PUBLICATIONS

LG Electronics: "UL Control Signaling for Supporting CA of up to 32 Carriers", 3GPP TSG RAN WG1 Meeting #80, R1-150210 ECA UL Control Signaling_Final, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 9, 2015-Feb. 13, 2015, 4 Pages, Jan. 30, 2015 (Jan. 30, 2015), XP050948547, p. 3, paragraph 1.

(Continued)

*Primary Examiner* — Sam Bhattacharya
(74) *Attorney, Agent, or Firm* — QUALCOMM Incorporated

(57) ABSTRACT

Various aspects relate to scheduling reference signals across multiple carriers (e.g., across cells). Signaling may be used to indicate whether reference signals are scheduled across multiple carriers. For example, a single instance of downlink control information (e.g., the downlink control information sent via a single time slot) that schedules multiple carriers (e.g., multiple component carriers) may include an indication of whether reference signals are scheduled for two or more of the scheduled carriers.

30 Claims, 15 Drawing Sheets

(56) References Cited

FOREIGN PATENT DOCUMENTS

| | | | |
|---|---|---|---|
| WO | 2014117671 | A1 | 8/2014 |
| WO | 2019214668 | A1 | 11/2019 |

OTHER PUBLICATIONS

Supplementary European Search Report—EP20915098—Search Authority—The Hague—Oct. 9, 2023.
International Search Report and Written Opinion—PCT/CN2020/074003—ISA/EPO—Oct. 30, 2020.

SCHEDULING REFERENCE SIGNALS FOR MULTIPLE CARRIERS

CROSS-REFERENCE TO RELATED APPLICATION(S)

This application is the U.S. national stage of PCT patent application number PCT/CN2020/074003 filed on Jan. 23, 2020.

INTRODUCTION

The technology discussed below generally relates to wireless communication and, more particularly but not exclusively, to scheduling reference signals for multiple carriers.

Next-generation wireless communication systems (e.g., 5GS) may include a 5G core network and a 5G radio access network (RAN), such as a New Radio (NR)-RAN. The NR-RAN supports communication via one or more carriers. For example a user equipment (UE) may communicate with a cell via a carrier and/or communicate with multiple cells via multiple carriers (e.g., component carriers).

As the demand for mobile broadband access continues to increase, research and development continue to advance communication technologies, including technologies for enhancing communication within a wireless network in particular, not only to meet the growing demand for mobile broadband access, but to advance and enhance the user experience with mobile communications.

SUMMARY

The following presents a summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure as a prelude to the more detailed description that is presented later.

In one aspect, the disclosure provides a wireless communication device configured for communication that includes a processor, a transceiver, and a memory that are communicatively coupled to one another. The processor and the memory are configured to receive, via the transceiver, downlink control information (DCI). The DCI includes a first indication that a first reference signal is scheduled for transmission on a first carrier of a plurality of carriers and that a second reference signal is scheduled for transmission on a second carrier of the plurality of carriers. The processor and the memory are further configured to determine information to send based on the DCI. The information to send is related to the first reference signal, the second reference signal, or a combination thereof. The processor and the memory are further configured to send the information via at least one of the first carrier or the second carrier.

In one aspect, the disclosure provides a method of communication for a wireless communication device. The method includes receiving downlink control information (DCI). The DCI includes a first indication that a first reference signal is scheduled for transmission on a first carrier of a plurality of carriers and that a second reference signal is scheduled for transmission on a second carrier of the plurality of carriers. The method further includes determining information to send based on the DCI. The information to send is related to the first reference signal, the second reference signal, or a combination thereof. The method also includes sending the information via at least one of the first carrier or the second carrier.

In one aspect, the disclosure provides a wireless communication device. The device includes means for receiving downlink control information (DCI). The DCI includes a first indication that a first reference signal is scheduled for transmission on a first carrier of a plurality of carriers and that a second reference signal is scheduled for transmission on a second carrier of the plurality of carriers. The device further includes means for determining information to send based on the DCI. The information to send is related to the first reference signal, the second reference signal, or a combination thereof. The device also includes means for sending the information via at least one of the first carrier or the second carrier.

In one aspect, the disclosure provides an article of manufacture for use by a wireless communication device in a wireless communication network. The article includes a computer-readable medium having stored therein instructions executable by one or more processors of the wireless communication device to receive downlink control information (DCI). The DCI includes a first indication that a first reference signal is scheduled for transmission on a first carrier of a plurality of carriers and that a second reference signal is scheduled for transmission on a second carrier of the plurality of carriers. The computer-readable medium further has stored therein instructions executable by one or more processors of the wireless communication device to determine information to send based on the DCI. The information to send is related to the first reference signal, the second reference signal, or a combination thereof. The computer-readable medium also has stored therein instructions executable by one or more processors of the wireless communication device to send the information via at least one of the first carrier or the second carrier.

In one aspect, the disclosure provides base station configured for communication that includes a processor, a transceiver, and a memory that are communicatively coupled to one another. The processor and the memory are configured to generate downlink control information (DCI). The DCI includes a first indication that a first reference signal is scheduled for transmission on a first carrier of a plurality of carriers and that a second reference signal is scheduled for transmission on a second carrier of the plurality of carriers. The processor and the memory are further configured to send the DCI to at least one wireless communication device via the transceiver.

In one aspect, the disclosure provides a method of communication for a base station. The method includes generating downlink control information (DCI). The DCI includes a first indication that a first reference signal is scheduled for transmission on a first carrier of a plurality of carriers and that a second reference signal is scheduled for transmission on a second carrier of the plurality of carriers. The method further includes sending the DCI to at least one wireless communication device.

In one aspect, the disclosure provides a base station. The base station includes means for generating downlink control information (DCI). The DCI includes a first indication that a first reference signal is scheduled for transmission on a first carrier of a plurality of carriers and that a second reference signal is scheduled for transmission on a second carrier of the plurality of carriers. The base station further includes means for sending the DCI to at least one wireless communication device.

In one aspect, the disclosure provides an article of manufacture for use by a wireless communication device in a wireless communication network. The article includes a computer-readable medium having stored therein instructions executable by one or more processors of the wireless communication device to generate downlink control information (DCI). The DCI includes a first indication that a first reference signal is scheduled for transmission on a first carrier of a plurality of carriers and that a second reference signal is scheduled for transmission on a second carrier of the plurality of carriers. The computer-readable medium also has stored therein instructions executable by one or more processors of the wireless communication device to send the DCI to at least one wireless communication device.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

DETAILED DESCRIPTION

Figure 1:
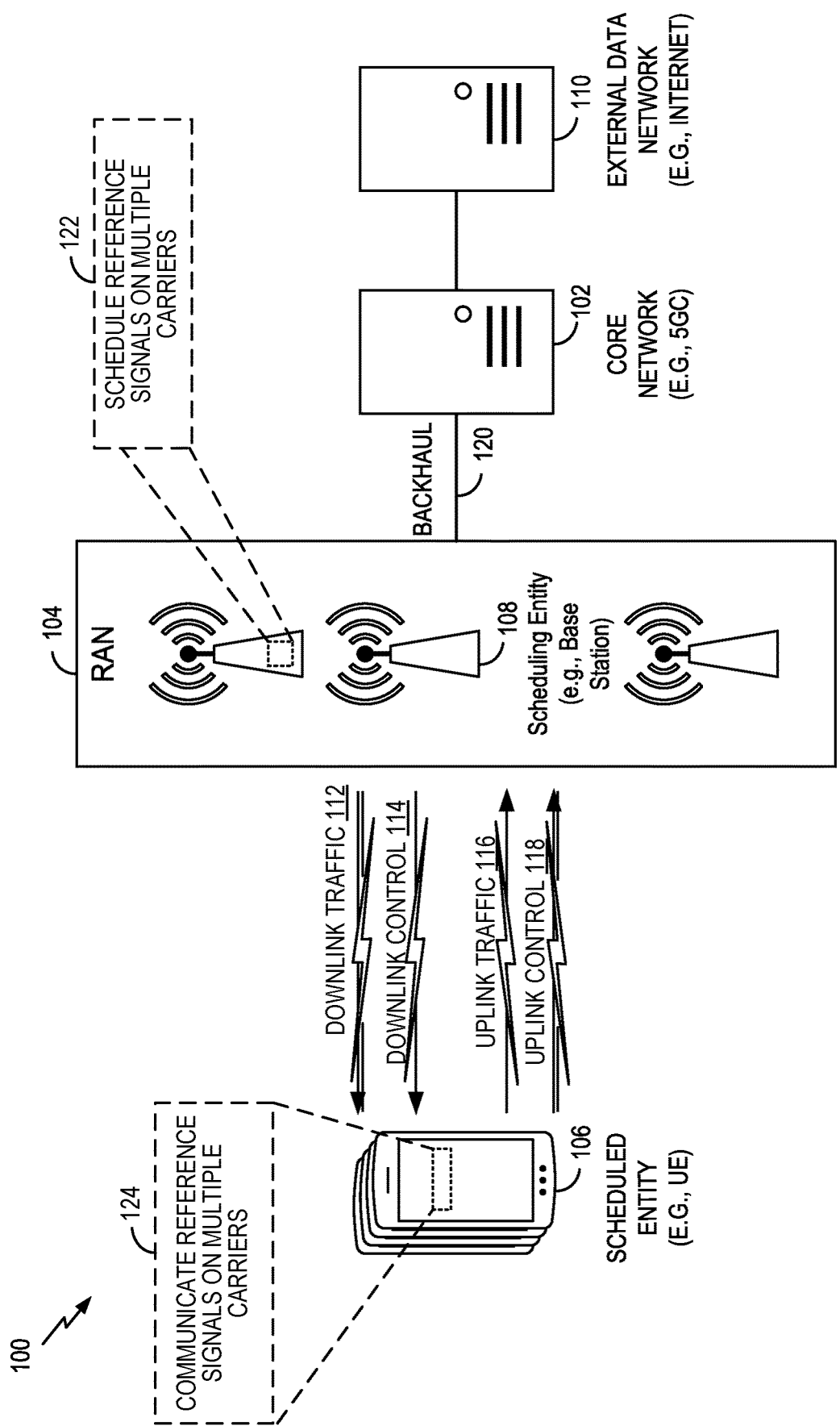
FIG. 1 is a schematic illustration of a wireless communication system within which aspects of the disclosure may be implemented.

Various aspects of the disclosure relate to scheduling reference signals across multiple carriers (e.g., across cells). The disclosure relates in some aspects to indicating whether reference signals are scheduled across multiple carriers. For example, a single instance of downlink control information (e.g., the downlink control information sent via a single time slot) that schedules multiple carriers (e.g., multiple component carriers) may include an indication of whether reference signals are scheduled for two or more of the scheduled carriers. A single instance of downlink control information may be referred to herein as a DCI or the DCI.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. Moreover, alternate configurations may be devised without departing from the scope of the disclosure. Additionally, well-known elements will not be described in detail or will be omitted so as not to obscure the relevant details of the disclosure.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc., of varying sizes, shapes and constitution.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. The RAN 104 includes a plurality of base stations 108. By virtue of the wireless communication system 100, the UE 106 may be enabled to carry out data communication with an external data network 110, such as (but not limited to) the Internet.

In accordance with various aspects of the disclosure, the RAN 104 (e.g., a base station 108) may be configured to schedule reference signals on multiple carriers 122 and to indicate (e.g., in a DCI) whether reference signals are scheduled on two or more carriers scheduled by the DCI. The base station 108 may also be configured to perform operations related to the scheduling. For example, the base station 108 may send information to the UE 106 and/or receive information from the UE 106 on one or more component carriers depending on how the reference signals are configured by the DCI. In addition, the UE 106 may be configured to communicate reference signals on multiple carriers 124 and to receive an indication (e.g., via a DCI) of whether reference signals are scheduled on two or more carriers (e.g., scheduled by the DCI). The UE 106 may be further configured to perform operations related to the scheduling. For example, the UE 106 may send or receive information on one or more component carriers depending on how the reference signals are scheduled. These and other aspects of indicating reference signal scheduling are described in more detail after the description of the wireless communication system 100 that follows.

The RAN 104 may implement any suitable radio access technology (RAT) or RATs to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. In another example, the RAN 104 may operate according to both the LTE and 5G NR standards. Of course, many other examples may be utilized within the scope of the present disclosure.

The actual telecommunication standard, network architecture, and/or communication standard used will depend on the specific application and the overall design constraints imposed on the system. For purposes of illustration, the following may describe various aspects in the context of a 5G and/or LTE system. It should be appreciated, however, that the teachings herein may be used in other systems as well. Thus, references to functionality in the context of 5G and/or LTE terminology should be understood to be equally applicable to other types of technology, networks, components, signaling, and so on.

As mentioned above, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a transmit-receive point (TRP), a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology. In examples where the RAN 104 operates according to both the LTE and 5G NR standards, one of the base stations 108 may be an LTE base station, while another base station may be a 5G NR base station. Accordingly, the functionality of a base station as discussed herein may be similar in one or more aspects to (or incorporated into) the functionality of a CIoT base station (C-BS), a NodeB, an evolved NodeB (eNodeB), radio access network (RAN) access node, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other suitable entity.

In some aspects, a base station may refer to a physical entity that incorporates radio head functionality for a particular physical cell. In some aspects, base station may include 5G new radio (NR) functionality with an air interface based on orthogonal frequency division multiplexing (OFDM). NR may support, for example and without limitation, enhanced mobile broadband (eMBB), mission-critical services, and wide-scale deployment of IoT devices.

The radio access network 104 is further illustrated supporting wireless communication for multiple mobile apparatuses. A mobile apparatus may be referred to as user equipment (UE) 106 in 3GPP standards, but may also be referred to by those skilled in the art as a mobile station (MS), a subscriber station, a mobile unit, a subscriber unit, a wireless unit, a remote unit, a mobile device, a wireless device, a wireless communication device, a remote device, a mobile subscriber station, an access terminal (AT), a mobile terminal, a wireless terminal, a remote terminal, a handset, a terminal, a user agent, a mobile client, a client, or some other suitable terminology. A UE 106 may be an apparatus that provides a user with access to network services. In examples where the RAN 104 operates according to both the LTE and 5G NR standards, the UE 106 may be an Evolved-Universal Terrestrial Radio Access Network-New Radio dual connectivity (EN-DC) UE that is capable of simultaneously connecting to an LTE base station and a NR base station to receive data packets from both the LTE base station and the NR base station.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc., electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may be a cellular device, an Internet of Things (IoT) device, a cellular IoT (CIoT) device, an LTE wireless cellular device, a machine-type communication (MTC) cellular device, a smart alarm, a remote sensor, a smart phone, a mobile phone, a smart meter, a personal digital assistant (PDA), a personal computer, a mesh node, a tablet computer, etc. A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
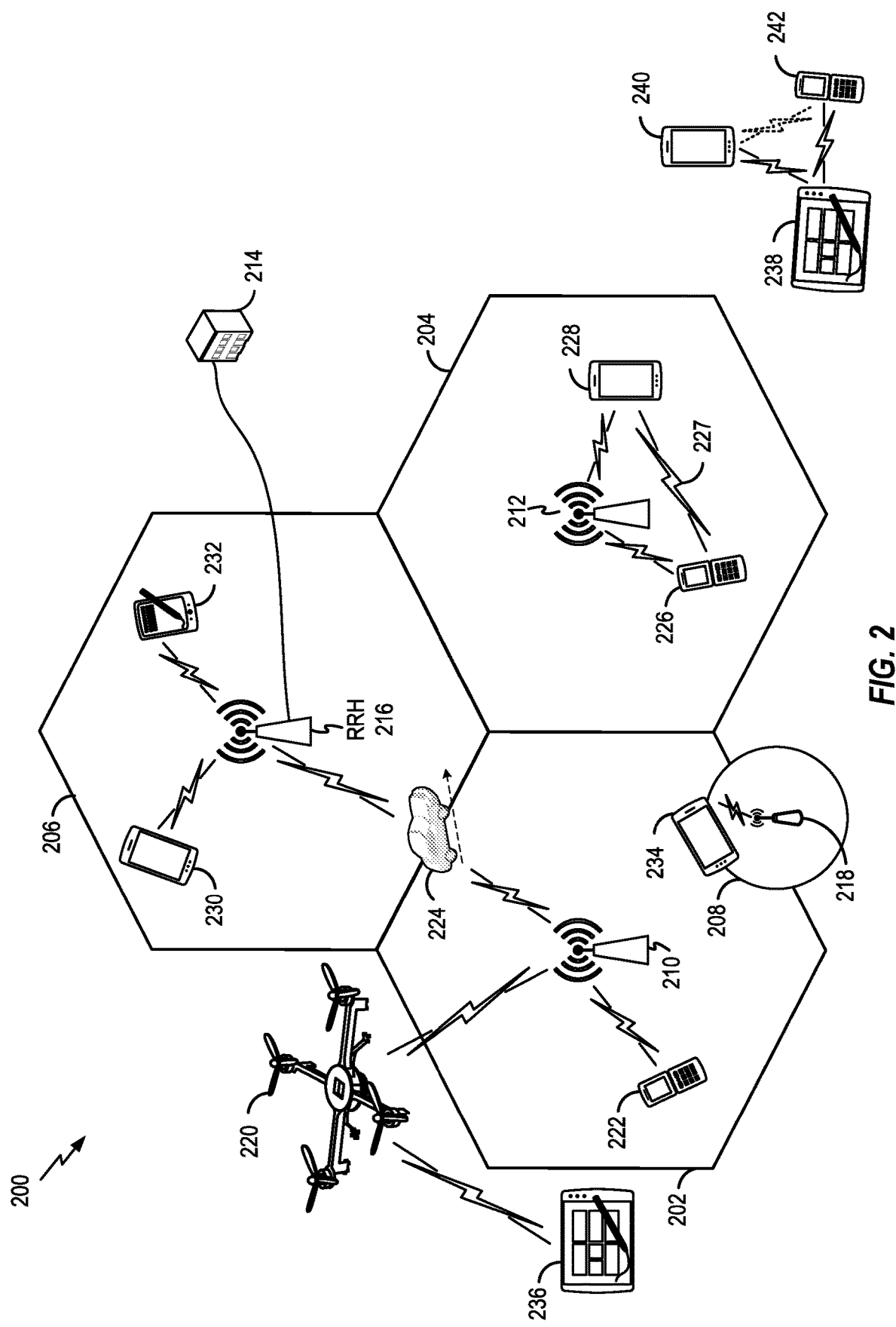
FIG. 2 is a conceptual illustration of a radio access network within which aspects of the disclosure may be implemented.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity. Thus, in a wireless communication system with scheduled access to time-frequency resources and having a cellular configuration, a P2P configuration, or a mesh configuration, a scheduling entity and one or more scheduled entities may communicate utilizing the scheduled resources. In some examples, the sidelink signals 227 include sidelink traffic (e.g., a physical sidelink shared channel) and sidelink control (e.g., a physical sidelink control channel).

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

A radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Channel coding may be used for transmissions over the radio access network 200 to obtain a low block error rate (BLER) while still achieving very high data rates. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In early 5G NR specifications, traffic is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Figure 3:
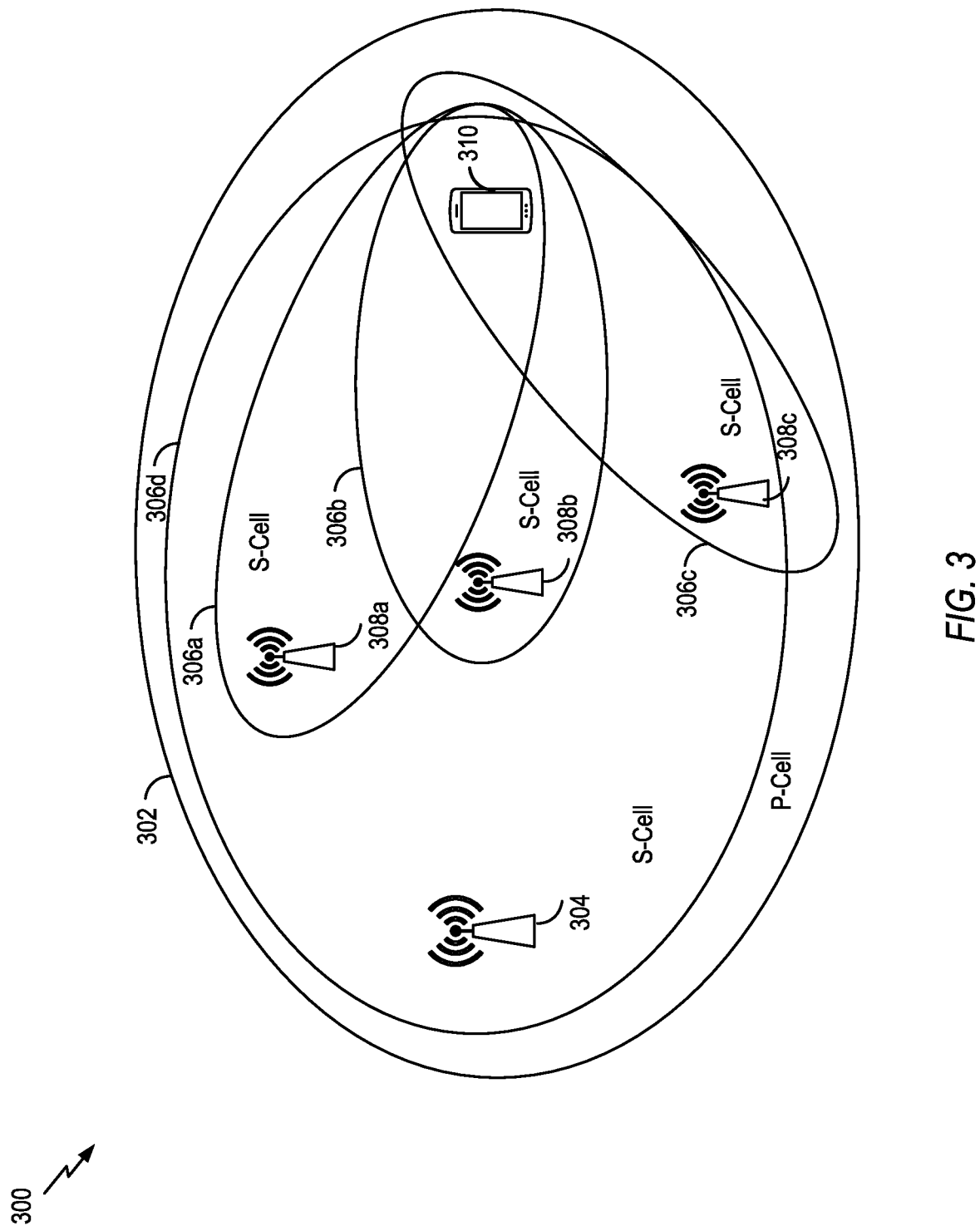
FIG. 3 is a conceptual illustration of a multi-cell transmission environment within which aspects of the disclosure may be implemented.

5G-NR networks may further support carrier aggregation of component carriers transmitted from different transmission and reception points (TRPs) in a multi-cell transmission environment. In some aspects, the term component carrier refers to a carrier frequency (or band) utilized for communication within a cell. An example of a multi-cell transmission environment 300 is shown in FIG. 3. The multi-cell transmission environment 300 includes a primary serving cell (PCell) 302 and one or more secondary serving cells (SCells) 306a, 306b, 306c, and 306d. The PCell 302 may be referred to as the anchor cell that provides a radio resource control (RRC) connection to the UE. In some examples, the PCell and the SCell may be co-located (e.g., different TRPs at the same location).

When carrier aggregation is configured, one or more of the SCells 306a-306d may be activated or added to the PCell 302 to form the serving cells serving a user equipment (UE) 310. Each serving cell corresponds to a component carrier (CC). The CC of the PCell 302 may be referred to as a primary CC, and the CC of a SCell 306a-306d may be referred to as a secondary CC. The PCell 302 and one or more of the SCells 306 may be served by a respective base station 304 and 308a-308c or scheduling entity similar to those illustrated in any of FIGS. 1 and 2. In the example shown in FIG. 3, SCells 306a-306c are each served by a respective base station 308a-308c. However, SCell 306d is co-located with the PCell 302. For example, base station 304 may include multiple TRPs, each supporting a different carrier. The coverage of the PCell 302 and SCell 306d may differ since component carriers in different frequency bands may experience different path loss.

The PCell 302 may add or remove one or more of the SCells 306a-306d to improve reliability of the connection to the UE 310 and/or increase the data rate. However, the PCell 302 may only be changed upon a handover to another PCell.

In some examples, the PCell 302 may utilize a first radio access technology (RAT), such as LTE, while one or more of the SCells 306 may utilize a second RAT, such as 5G-NR. In this example, the multi-cell transmission environment may be referred to as a multi-RAT-dual connectivity (MR-DC) environment. In some examples, the PCell 302 may be a low band cell, and the SCells 306 may be high band cells. A low band (LB) cell uses a CC in a frequency band lower than that of the high band cells. For example, the high band cells may use mmWave CC, and the low band cell may use a CC in a band (e.g., sub-6 GHz band) lower than mmWave. In general, a cell using a mmWave CC can provide greater bandwidth than a cell using a low band CC. In addition, when using above-6 GHz frequency (e.g., mmWave) carriers, beamforming may be used to transmit and receive signals.

The PCell 302 is responsible not only for connection setup, but also for radio resource management (RRM) and radio link monitoring (RLM) of the connection with the UE 310. For example, the PCell 302 may activate one or more of the SCells (e.g., SCell 306a) for multi-cell communication with the UE 310. In some examples, the PCell may activate the SCell 306a on an as-needed basis instead of maintaining the SCell activation when the SCell 306a is not utilized for data transmission/reception in order to reduce power consumption by the UE 310. However, there is a delay involved in activating the SCell 306a, primarily as a result of the time involved in time/frequency synchronization between the UE 310 and the SCell 306a. For example, in order for the UE 310 to synchronize with the SCell 306a, the UE 310 and/or SCell 306a may measure or otherwise utilize one or more reference signals communicated between the UE 310 and the SCell 306a. Examples of reference signals may include, but are not limited to, aperiodic or semi-persistent downlink CSI-RSs, downlink synchronization signal blocks (SSBs), and/or uplink SRSs.

The disclosure relates in some aspects to a single DCI scheduling reference signals (RSs) for multiple carriers (e.g., across CCs or cells). This scheme may be used, for example, in NR dynamic spectrum sharing (DSS). In DSS, cross-carrier scheduling may involve, for example, a physical downlink control channel (PDCCH) of a secondary cell (SCell) or a primary cell (PCell) scheduling a physical downlink shared channel (PDSCH) or a physical uplink shared channel (PUSCH) on a PCell and/or an SCell.

In accordance with various aspects of the disclosure, when a single DCI schedules reference signals on multiple CCs, the DCI may indicate the type of reference signal scheduled on each of the scheduled CCs. By indicating the scheduling in this way, a device that receives the DCI can efficiently determine how to receive and/or send reference signals, where the reference signals are scheduled (e.g., on which CCs), and how the scheduling is configured (e.g., which trigger state identifiers are being used).

The reference signals may be scheduled on the uplink and/or on the downlink. The scheduling may mix reference signals on different CCs (e.g., CSI-RS and SRS may be scheduled on different CCs during the same slot).

A DCI may schedule various types of reference signals on different CCs. In some aspects, scheduled reference signals may include: a sounding reference signal (SRS) and/or a channel state information reference signal (CSI-RS). Other reference signals may be scheduled in other examples.

A DCI may indicate other information relating to the scheduling of reference signals as well. For example, a DCI may indicate on which CC or CCs a UE is to send one or more CSI reports.

As another example, a DCI may use a mapping of reference signal trigger state identifiers (RS Trigger State IDs) to efficiently signal a particular RS Trigger State ID on a particular carrier. In some implementations, the DCI may indicate a CC index and a corresponding RS Trigger State ID for a scheduled reference signal. In some implementations, a set of RS trigger state IDs on different CCs may be mapped to one multi-CC RS trigger state ID. This multi-CC RS trigger state ID may be signaled in the DCI in some examples. The RS Trigger State ID mapping may be configured via a radio resource control (RRC) message, a medium access control-control element (MAC-CE), downlink control information (DCI), or in some other way.

In some implementations, the downlink control information discussed herein (e.g., scheduling of reference signals) may be sent via a MAC-CE. Thus, a MAC-CE may be used to activate the scheduling of UL/DL reference signals on multiple CCs (e.g., semi-persistent CSI-RS/SRS) and/or deactivate the scheduling of UL/DL reference signals on multiple CCs.

Figure 4:
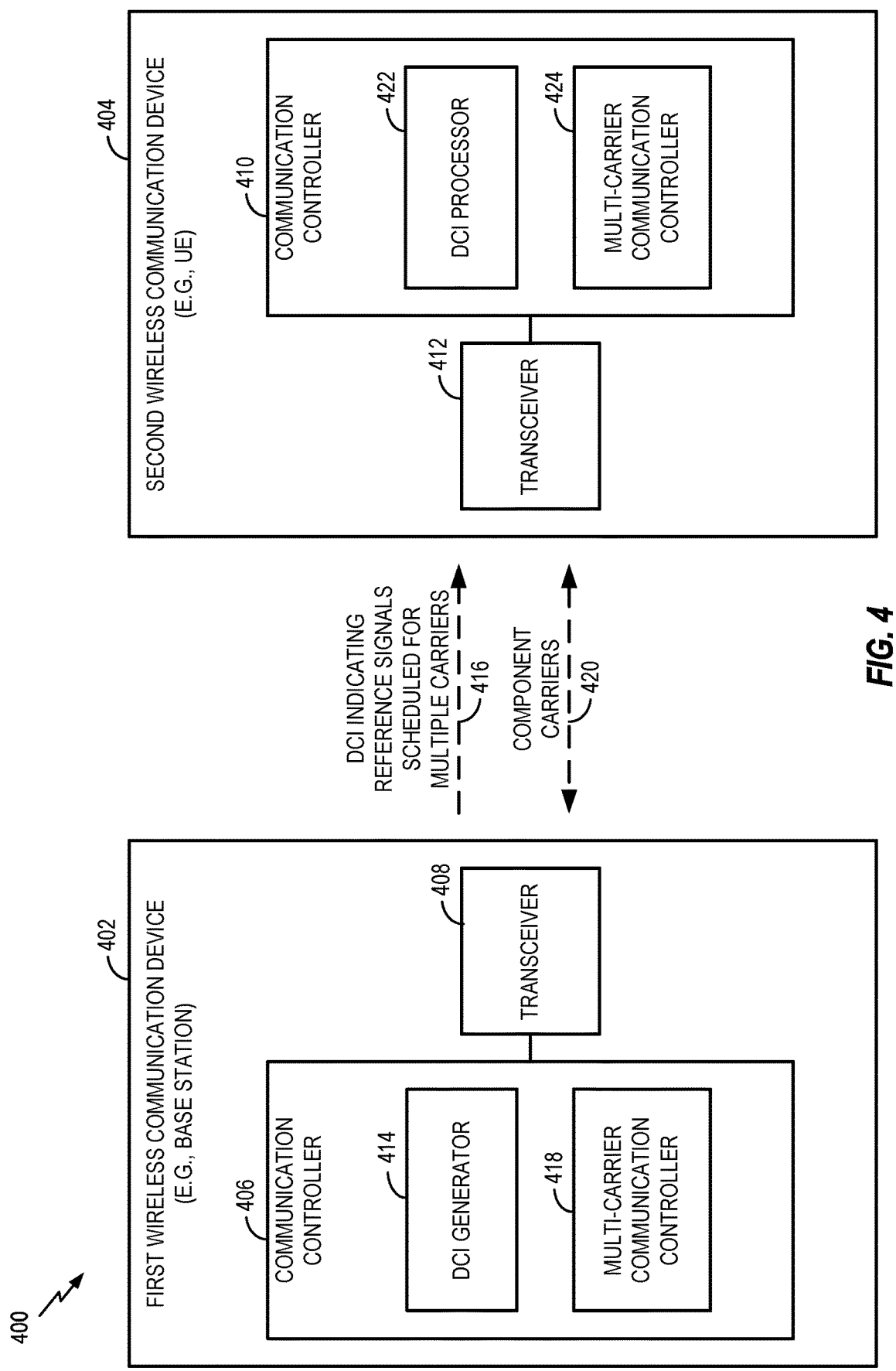
FIG. 4 is a block diagram illustrating a wireless communication system where downlink control information indicates reference signal scheduling in accordance with some aspects of the disclosure.

FIG. 4 is a schematic illustration of a wireless communication system 400 that may be used to schedule and communicate reference signals as taught herein. The wireless communication system 400 includes a first wireless communication device 402 (e.g., a base station) and a second wireless communication device 404 (e.g., a UE), and potentially other devices (not shown). In some implementations, the first device 402 may correspond to a BS 108 (e.g., a gNB, a transmit receive point, etc.) of FIG. 1. In some implementations, the second device 404 may correspond to the UE 106 of FIG. 1.

The first device 402 includes a communication controller 406 for controlling communication with (e.g., transmitting to and/or receiving from) the second device 404 and/or other devices via a transceiver 408. The second device 404 includes a communication controller 410 for controlling communication with (e.g. transmitting to and/or receiving from) the first device 402 and/or other devices via a transceiver 412.

The communication controller 406 includes a DCI generator 414 for generating a DCI 416 that schedules references signals for multiple carriers as taught herein. For example, the DCI generator 414 may generate a DCI that includes one or more indications of: which CCs are scheduled, which reference signals are scheduled on which carriers, where CSI reports are scheduled, RS Trigger State IDs, and so on.

The communication controller 406 also includes a multi-carrier communication controller 418 for sending or receiving information and signals via multiple CCs 420. For example, for downlink communication, the multi-carrier communication controller 418 may generate downlink data and signaling that are sent on the CCs 420. For uplink communication, the multi-carrier communication controller 418 may process uplink data and signaling received on the CCs 420.

The communication controller 410 of the second device 404 includes a DCI processor 422 for receiving and analyzing the DCI 416. For example, the DCI processor 422 may parse the indication(s) included in the DCI to determine: where reference signals are scheduled on the scheduled carriers, where CSI reports are scheduled, RS Trigger State IDs, and so on.

The communication controller 410 also includes a multi-carrier communication controller 424 for sending or receiving information and signals via the CCs 420 as taught herein. For example, for uplink communication, the multi-carrier communication controller 424 may generate information and signals that are sent on the CCs 420. For downlink communication, the multi-carrier communication controller 418 may process information and signals that are received on the CCs 420.

Figure 5:
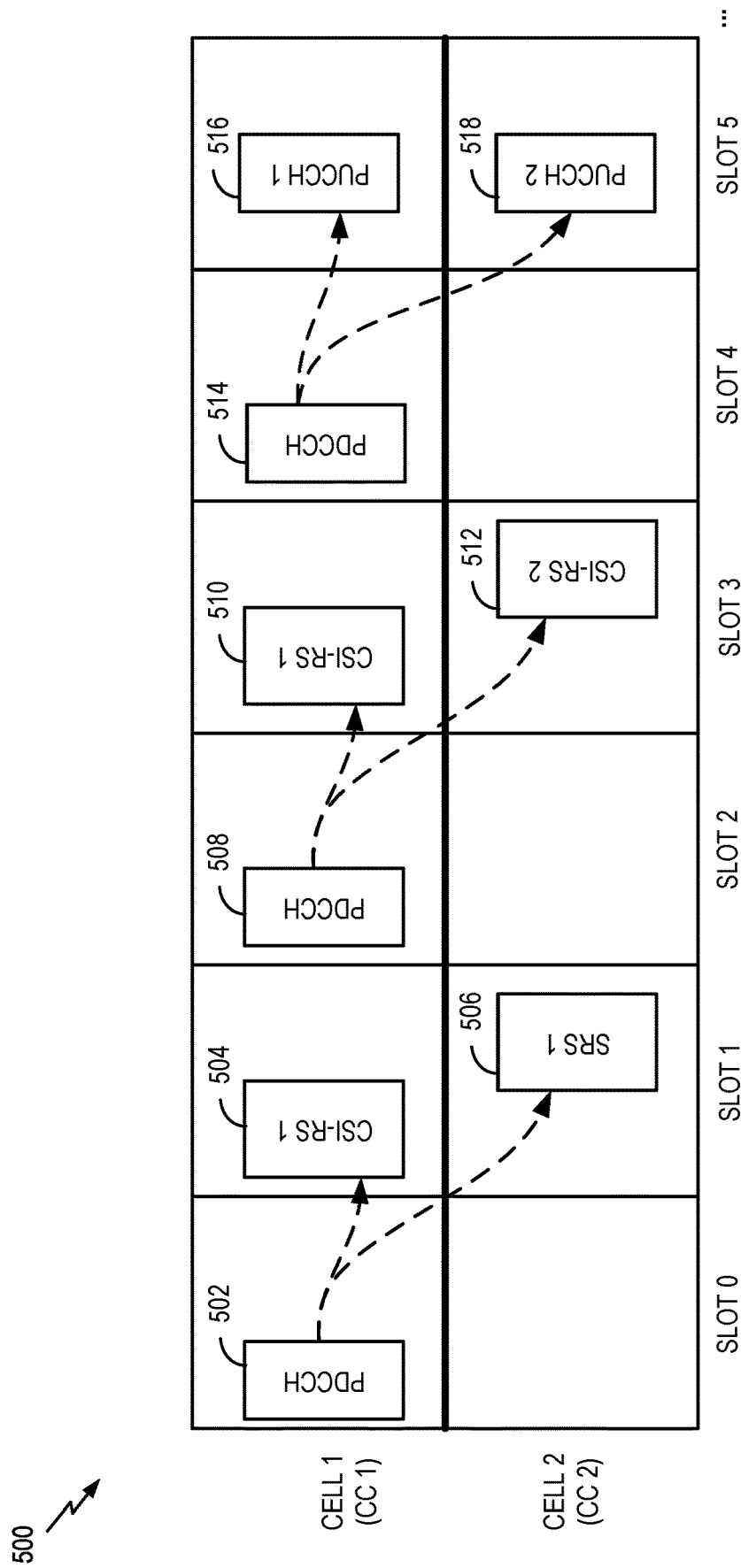
FIG. 5 is a block diagram conceptually illustrating scheduling of reference signals and uplink control information on multiple carriers in accordance with some aspects of the disclosure.

FIG. 5 illustrates an example of scheduling 500 that may be specified by a DCI. As discussed herein, the DCI may be carried in a PDCCH in some examples.

In slot 0, a PDCCH 502 of a first CC (CC 1) schedules reference signal transmissions in slot 1. Specifically, the DCI (not shown in FIG. 5) of the PDCCH 502 schedules a CSI-RS 504 (CSI-RS 1) on CC1 and schedules an SRS 506 (SRS 1) on CC2. Thus, a gNB (not shown in FIG. 5) may send the CSI-RS 1 to a UE (not shown in FIG. 5) on CC1 and receive the SRS 1 from the UE on CC2. The UE that receives the PDCCH 502 and the CSI-RS 504 and transmits the SRS 506 can thereby determine when and where CSI-RS 1 will be received and can also determine when and where to send the SRS 1.

In slot 2, a PDCCH 508 of the first CC (CC 1) schedules reference signal transmissions in slot 3. Specifically, the DCI of the PDCCH 508 schedules a first CSI-RS 510 (CSI-RS 1) on CC1 and schedules a second CSI-RS 512 (CSI-RS 2) on CC2. Thus, a gNB may send the CSI-RS 1 to a UE on CC1 and send the CSI-RS 2 to the UE on CC2. The UE that receives the PDCCH 502, the CSI-RS 510, and the CSI-RS 512 can thereby determine when and where CSI-RS 1 and CSI-RS 2 will be received. In addition, the UE may, for example, combine CSI-RS 1 and CSI-RS 2 to generate a more robust CSI report.

In slot 4, a PDCCH 514 of the first CC (CC 1) schedules PUCCH transmissions in slot 5. Specifically, the DCI of the PDCCH 514 schedules a first PUCCH 516 (PUCCH 1) on CC1 and schedules a second PUCCH 518 (PUCCH 2) on CC2. A UE may then send the first PUCCH 516 on CC1 and send the second PUCCH 518 on CC2. A gNB that sent the PDCCH 514 and receives the first PUCCH 516 and the second PUCCH 518 can, for example, combine the PUCCH information to more reliably obtain the uplink control information.

Figure 6:
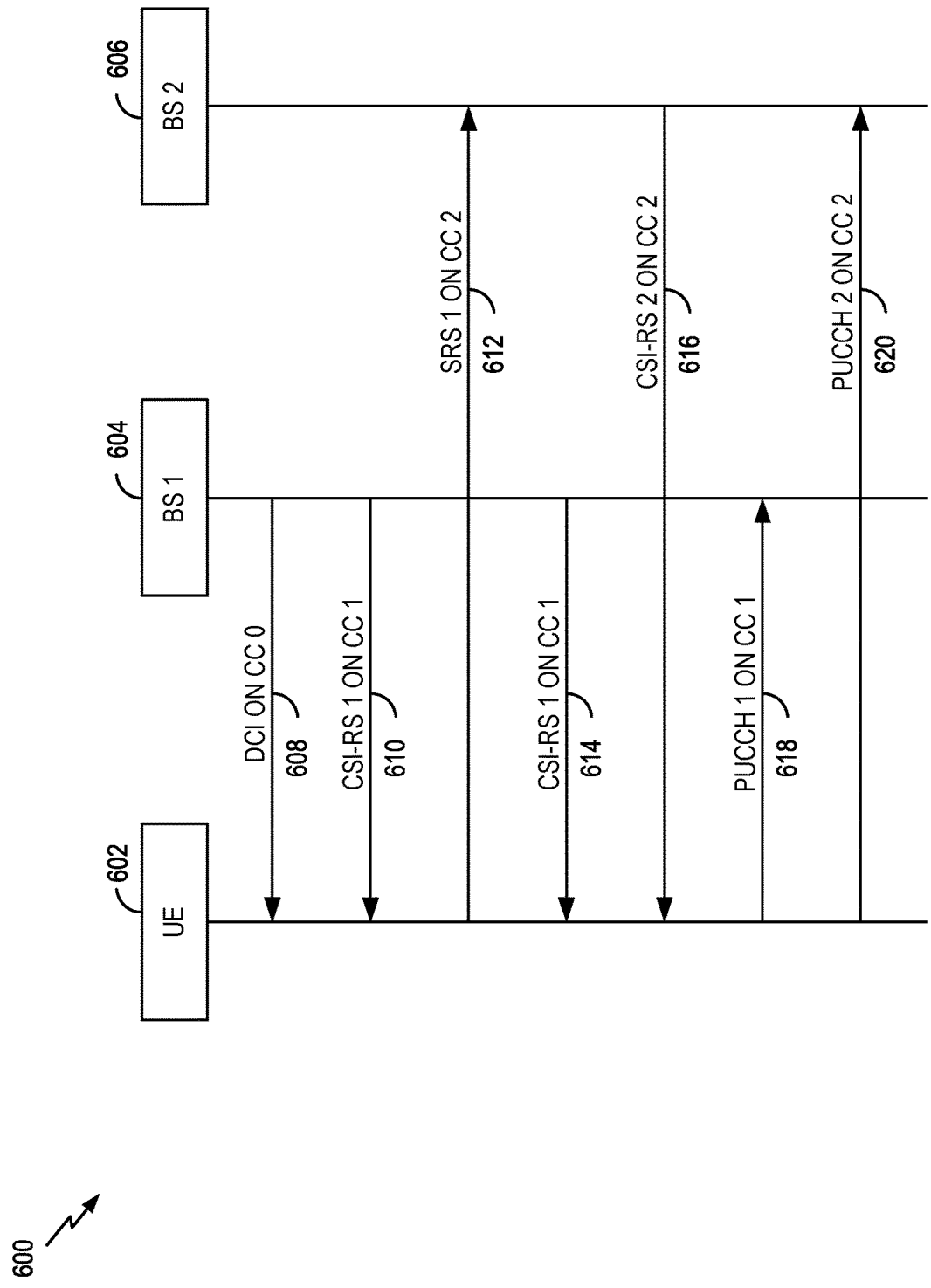
FIG. 6 is a timing diagram illustrating signaling between communication devices that communicate on multiple carriers in accordance with some aspects of the disclosure.

FIG. 6 illustrates an example of signaling for multi-carrier synchronization signal scheduling between devices of a wireless communication system 600. The system 600 includes a UE 602, a first BS 604, and a second BS 606. In some implementations, the UE 602 may correspond to the UE 106 of FIG. 1. In this example, the first BS 604 serves two cells (CC0 and CC1), while the second BS 606 serves one cell (CC2). In other examples, all of the cells (CC0, CC1, and CC3) may be served by a single BS. In some examples, the cells CC0, CC1 and CC2 may be co-located or quasi-co-located. In some implementations, the BS 604 or the BS 606 may correspond to a BS 108 (e.g., a gNB, a transmit receive point, etc.) of FIG. 1.

At a step 608, the first BS 604 sends a DCI on CC0. In accordance with various aspects of the disclosure, the DCI schedules reference signals on CC1 and CC2.

As a first example, the DCI may indicate that CSI-RS is scheduled on CC1 and that SRS is scheduled on CC2. In this case, the first BS 604 sends CSI-RS 1 to the UE 602 on CC1 at step 610 and the UE sends SRS 1 to the second BS 606 on CC2 at step 612.

As a second example, the DCI may indicate that CSI-RS is scheduled on CC1 and CC2. In this case, the first BS 604 sends CSI-RS 1 to the UE 602 on CC1 at step 614 and the second BS 606 sends CSI-RS 2 to the UE 602 on CC2 at step 616.

As a third example, the DCI may indicate that PUCCH is scheduled on CC1 and CC2. In this case, the UE 602 sends PUCCH 1 to the first BS 604 on CC1 at step 618 and the UE 602 sends PUCCH 2 to the second BS 606 on CC2 at step 620.

Other types of signaling may be used in other examples.

The disclosure relates in some aspects to an RS Trigger State ID mapping scheme. For example, particular values of a set of bits in the DCI may be mapped to a set of RS Trigger State IDs for different CCs (cells). In this way, the number of bits in the DCI may be reduced as compared to, for example, a scheme where there is a separate RS Trigger State ID indication for each carrier in the DCI.

Figure 7:
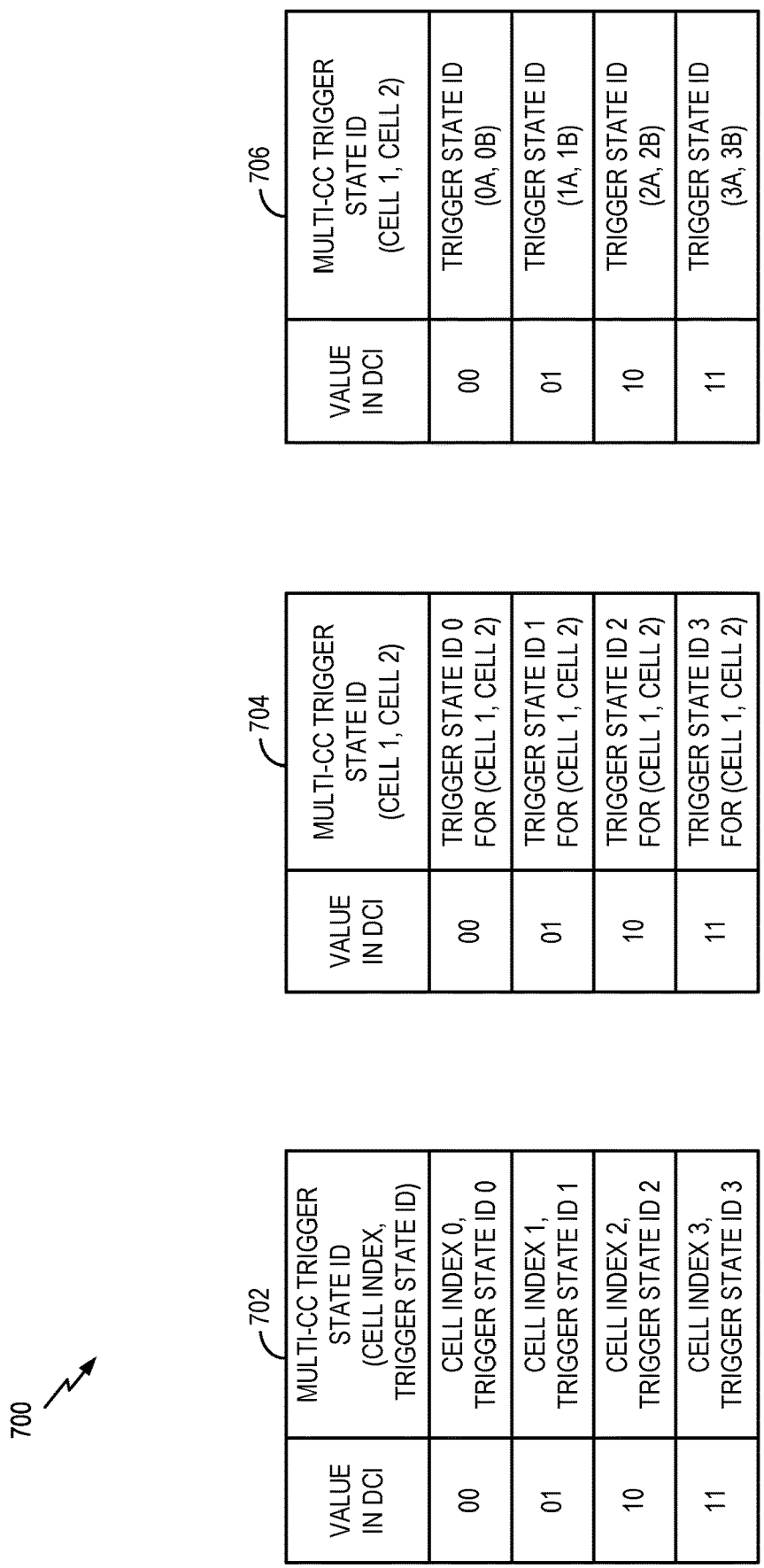
FIG. 7 is a block diagram conceptually illustrating trigger state identifier mapping in accordance with some aspects of the disclosure.

FIG. 7 illustrates examples of RS Trigger State ID mappings 700 in accordance with various aspects of the disclosure. The mappings 700 will be described in the context of three tables: a table 702, a table 704, and a table 706. In this example, there are two bits in the DCI for RS Trigger State ID mapping. Other types of mappings could be used in other examples.

The table 702 maps the two-bit value from the DCI to a cell index (CC index) and a RS Trigger State ID. A two-bit value of 00 in the DCI maps to cell index 0 and RS Trigger State ID 0 on the cell index 0. A two-bit value of 01 in the DCI maps to cell index 1 and RS Trigger State ID 1 on the cell index 1. A two-bit value of 10 in the DCI maps to cell index 2 and RS Trigger State ID 2 on the cell index 2. A two-bit value of 11 in the DCI maps to cell index 3 and RS Trigger State ID 3 on the cell index 3. Thus, for example, a UE that receives a DCI with a two-bit value of 01 can determine that RS Trigger State ID 1 is scheduled on cell 1 (CC 1).

The table 704 maps the two-bit value from the DCI to an RS Trigger State ID for two cells (cell 1 and cell 2). A two-bit value of 00 in the DCI maps to RS Trigger State ID 0 for cell 1 and cell 2. A two-bit value of 01 in the DCI maps to RS Trigger State ID 1 for cell 1 and cell 2. A two-bit value of 10 in the DCI maps to RS Trigger State ID 2 for cell 1 and cell 2. A two-bit value of 11 in the DCI maps to RS Trigger State ID 3 for cell 1 and cell 2. Thus, for example, a UE that receives a DCI with a two-bit value of 01 can determine that RS Trigger State ID 1 is scheduled for cell 1 (CC 1) and cell 2 (CC 2). RRC and MAC-CE signaling can be used to configure the cells that are to be used by the RS trigger state ID. For example, RRC signaling may configure that the cell 3 and the cell 4 apply the RS Trigger State ID indicated by the two-bit value in the DCI.

The table 706 maps the two-bit value from the DCI to an RS Trigger State ID for two cells (cell 1 and cell 2). A two-bit value of 00 in the DCI maps to RS Trigger State ID 0A for cell 1 and RS Trigger State ID 0B for cell 2. A two-bit value of 01 in the DCI maps to RS Trigger State ID 1A for cell 1 and RS Trigger State ID 1B for cell 2. A two-bit value of 10 in the DCI maps to RS Trigger State ID 2A for cell 1 and RS Trigger State ID 2B for cell 2. A two-bit value of 11 in the DCI maps to RS Trigger State ID 3A for cell 1 and RS Trigger State ID 3B for cell 2. RRC and MAC-CE signaling can be used to configure the table, which associates each RS Trigger State codepoint (e.g., value) in DCI and the exact RS Trigger State values for different cells. For example, RRC signaling can configure a list of entries, where each entry contains RS Trigger States for multiple cells, and MAC-CE signaling can select a subset of entries from the list. The DCI codepoints for RS Triggering can be mapped in order to the entries in the subset selected by the MAC-CE signaling.

Figure 8:
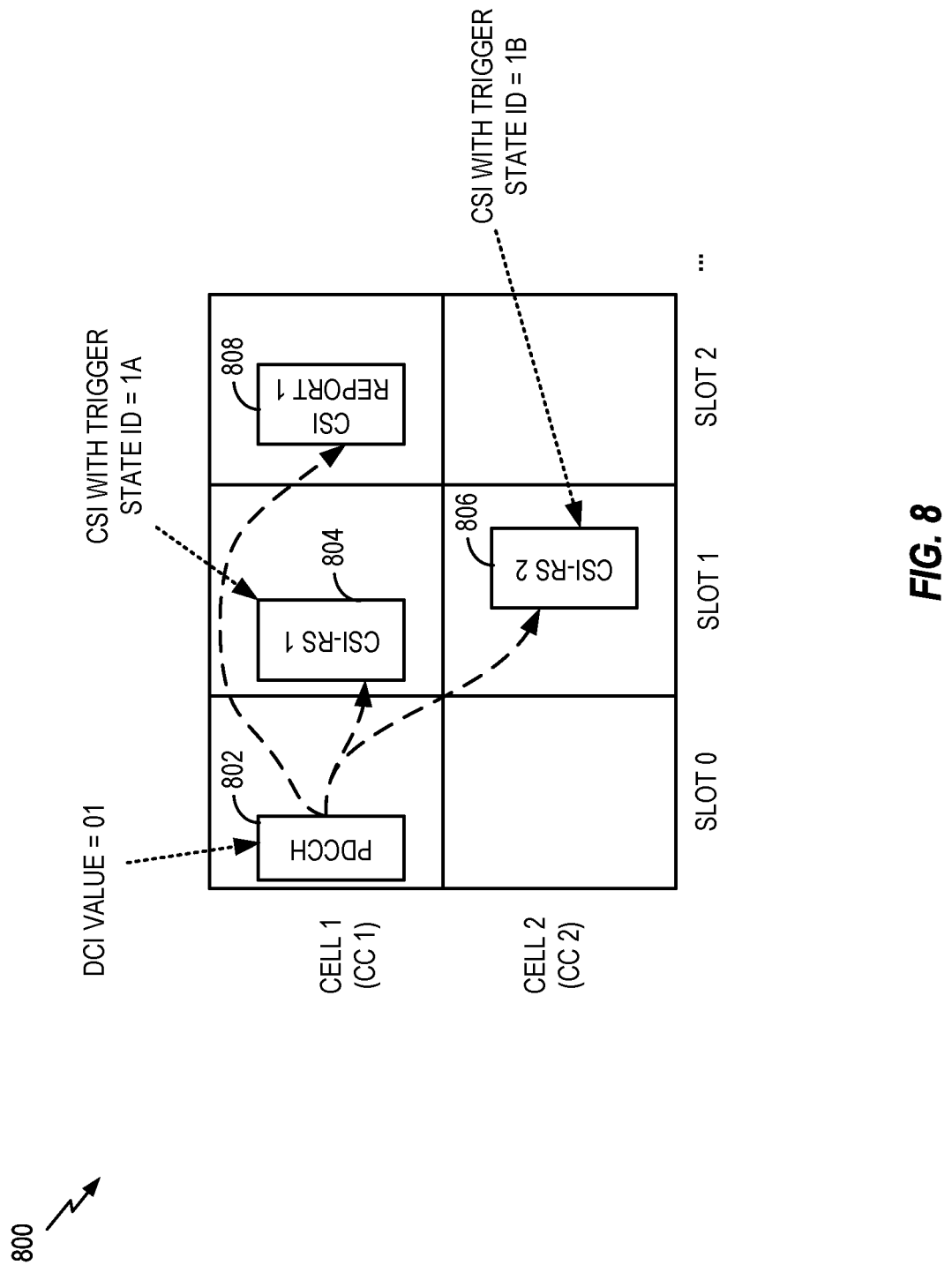
FIG. 8 is a block diagram conceptually illustrating scheduling of reference signals on multiple carriers based on a trigger state identifier mapping in accordance with some aspects of the disclosure.

Thus, for example, a UE that receives a DCI with a two-bit value of 01 can determine based on the table 706 that RS Trigger State ID 1A is scheduled for CC1 (cell 1) and RS Trigger State ID 1B is scheduled for CC2 (cell 2). FIG. 8 illustrates an example of scheduling 800 based on this mapping. A PDCCH 802 transmitted in slot 0 schedules a first CSI-RS 804 (CSI-RS 1) and a second CSI-RS 804 (CSI-RS 2) in slot 0. Here, the first CSI-RS 804 is scheduled on CC1 and the second CSI-RS 806 is scheduled on CC2. The PDCCH 802 also schedules a CSI report 808 in cell 1 during slot 2. A DCI (not shown in FIG. 8) in the PDCCH 802 includes a two-bit value of 01 for the RS Trigger State ID mapping. Accordingly, based on table 706, a UE that receives the PDCCH 802 can determine that RS Trigger State ID 1A is scheduled for CC1 and RS Trigger State ID 1B is scheduled for CC2.

A single DCI may be used to indicate the CC(s) on which a device is to report the CSI measured by DL reference signals that were scheduled on multiple CCs. In some implementation, a CSI report is transmitted in a PUSCH and/or PUCCH on the same CC that was used to measure the reference signal.

In some implementations, CSI reports based on the reference signals on all or a subset of the scheduled CCs are transmitted in PUSCH and/or PUCCH on one CC. The CC to be used for reporting the CSI may be signaled (e.g., by a gNB) or selected based on a predefined decision process.

For example, a gNB can explicitly indicate the mapping between scheduled reference signal CCs and the CC specified for the CSI report. This mapping may be sent via RRC signaling, via a MAC-CE, or via a DCI (which can be the same DCI that scheduled the reference signals on the multiple CCs).

As another example, the CC used for a CSI report may be implicitly determined. In one scenario, if there is only one reference signal CC scheduled by the single DCI, that CC is used to report the CSI. In another scenario, the CC with the lowest index is used to report the CSI. In another scenario, the CC with the highest index is used to report the CSI. Other CC selection processes may be used in other examples.

As another example, a CSI report based on the reference signal of one scheduled CC can be transmitted in the PUSCH and/or the PUCCH on multiple CCs for reliability. For example, the same CSI report may be sent on multiple carriers. The gNB can indicate the mapping between the scheduled reference signal CC and the multiple CSI report CCs as well as corresponding redundancy versions and beams to use on the different CCs. This mapping may be sent via RRC signaling, via a MAC-CE, or via a DCI.

In some aspects, different redundancy versions (RVs) may be used to provide combinable first information and second information that are sent on different CCs. For example, a device may send first information and second information associated with one RV on one CC and send first information and second information associated with a different RV on another CC. In this scenario, the DCI may indicate the different RVs to be used on the different CCs.

RVs may be used, for example, in a hybrid automatic repeat request (HARQ) scheme. HARQ is a technique in which the integrity of packet transmissions (e.g., code blocks) may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc. In chase combining HARQ (HARQ-CC), a retransmitted code block is identical to the original transmission of the code block. That is, if a code block is not decoded properly at the receiving device, resulting in a NACK, then the transmitting device may retransmit the full code block including information identical to the original transmission. The information may then ideally be obtained error-free by virtue of a process called soft combining, where the redundant bits from the retransmission may be combined before decoding to increase the probability of correct reception of each bit. On the other hand, in incremental redundancy HARQ (HARQ-IR), the retransmitted code block may be different from the originally transmitted code block, and further, if multiple retransmissions are made, each retransmission may differ from one another. Here, retransmissions may include different sets of coded bits: for example, corresponding to different code rates or algorithms; corresponding to different portions of the original code block, some of which may not have been transmitted in the original transmission; corresponding to forward error correction (FEC) bits that were not transmitted in the original transmission; or other suitable schemes. As with HARQ-CC, here, the information may be obtained error-free by utilizing soft combining to combine the retransmitted bits with the original transmitted bits.

NR uses low density parity check (LDPC) codes for DL shared channels. LDPC codes utilize HARQ-IR to send different redundancy versions (RVs) of data with each retransmission. For example, four redundancy versions may be sent in the following default order: redundancy version 0 (RV0), redundancy version 2 (RV2), redundancy version 3 (RV3), and redundancy version 1 (RV1). Each redundancy version may include systematic bits (e.g., bits carrying the information to be transmitted) and/or parity bits (e.g., bits carrying redundant information produced from combinations of the original information). For LDPC codes, not all RVs contain the same amount of systematic bits. RV0 and RV3 contain a significant number of systematic bits and are, as a result, self-decodable (e.g., it may be possible to decode the data using these bits, without the need for additional bits). In contrast, RV1 and RV2 do not contain a significant number of systematic bits (e.g., they may primarily include parity bits) and are, as a result, not self-decodable (e.g., it is generally not possible to decode the data using these bits alone). Other types of RVs may be used in other examples.

In some aspects, different beams may be used to provide combinable first information and second information that are sent on different CCs. Beamforming techniques may be used to counteract or reduce the effect of attenuation and provide a highly directional communication beam that uses the wireless communication channels more effectively. Beamforming generally utilizes an array of antennas configured for directional signal transmission or reception. To transmit a beam by beamforming, the phase and relative amplitude of the signal transmitted by each transmitter or antenna are controlled such that a pattern of constructive and destructive interference in the wavefront is created. At the receiver, signals from different antennas or sensors are combined to recover the beamformed signal. In some examples, a device (e.g., a base station) may include two or more TRPs, each communicating on a different CC. The base station may use one beam to send first information and second information on one CC and use a different beam to send first information and second information on another CC. In this scenario, the DCI may indicate the different beams to be used on the different CCs.

Figure 9:
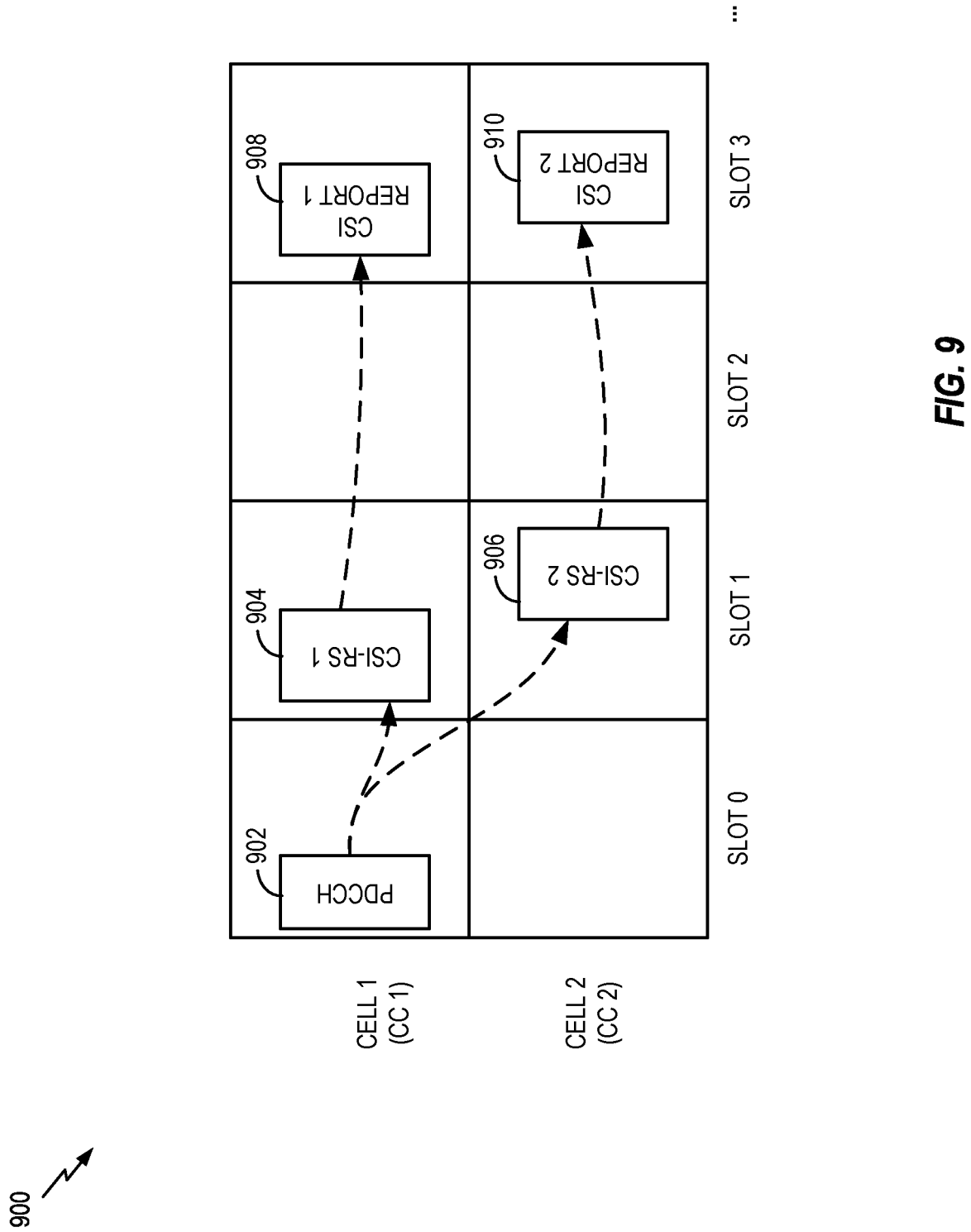
FIG. 9 is a block diagram conceptually illustrating scheduling of a CSI report based on a CSI-RS being scheduled on the same carrier that carried the CSI-RS in accordance with some aspects of the disclosure.

FIG. 9 illustrates an example of CSI report scheduling 900 that may be specified by a DCI. As discussed herein the DCI may be carried in a PDCCH in some examples.

In slot 0, a PDCCH 902 of a first CC (CC 1) schedules CSI-RS transmissions in slot 1. Specifically, the DCI (not shown in FIG. 9) of the PDCCH 902 schedules a first CSI-RS 904 (CSI-RS 1) on CC1 and schedules a second CSI-RS 906 (CSI-RS 2) on CC2.

In addition, the DCI schedules CSI reports in slot 3. Specifically, the DCI schedules a first CSI report (CSI Report 1) on CC1 (cell 1) and a second CSI report (CSI Report 2) on CC2 (cell 2). In this example, a CSI report is scheduled on the same CC as the corresponding CSI-RS.

Thus, a UE (not shown in FIG. 9) generates the first CSI report 908 based on the first CSI-RS 904 and sends the first CSI report 908 via the CC1. In addition, the UE generates the second CSI report 910 based on the second CSI-RS 904 and sends the second CSI report 910 via CC2.

Figure 10:
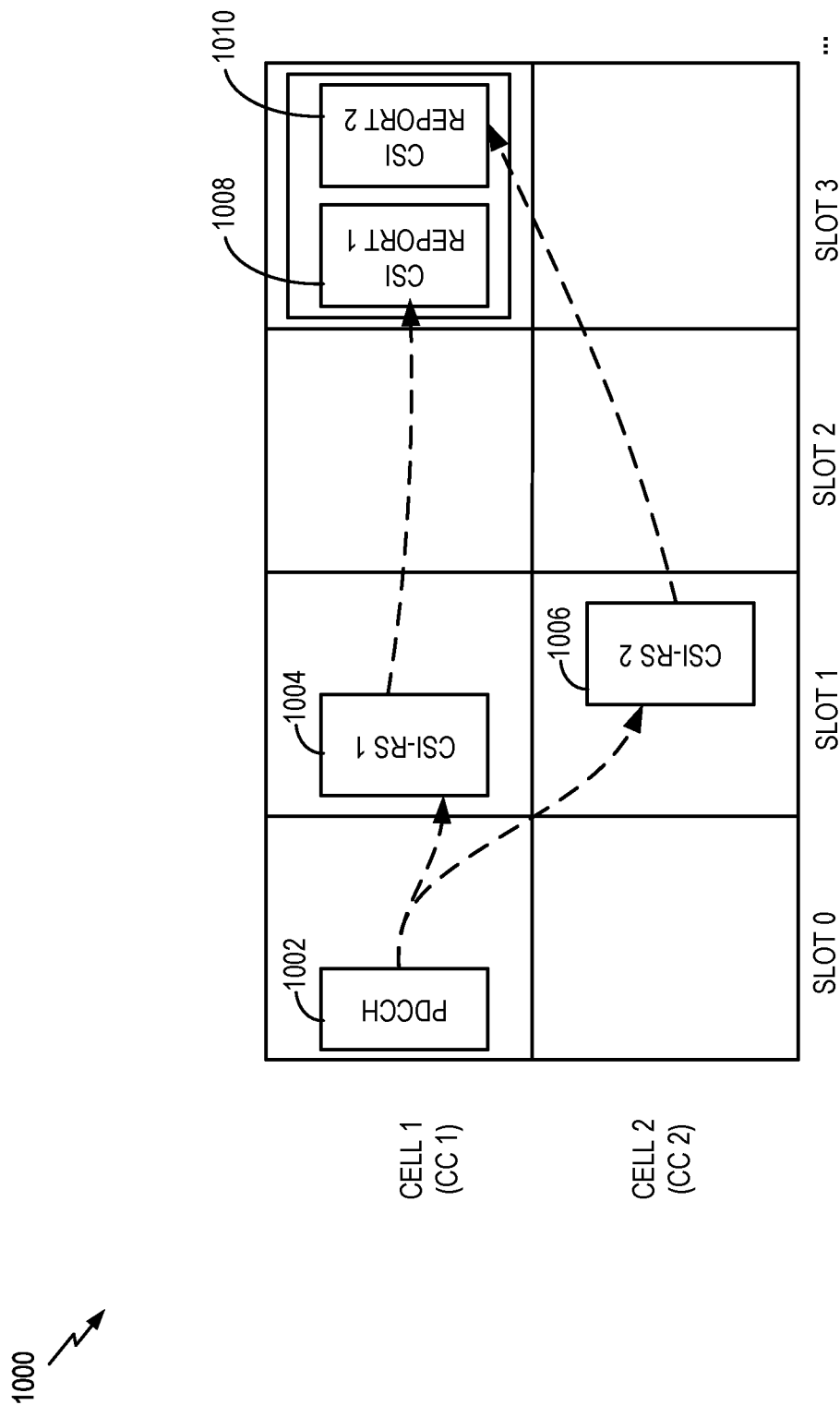
FIG. 10 is a block diagram conceptually illustrating CSI reports for different carriers being scheduled on the same carrier in accordance with some aspects of the disclosure.

FIG. 10 illustrates another example of CSI report scheduling 1000 that may be specified by a DCI. In this example, multiple CSI reports are schedule on the same CC.

In slot 0, a PDCCH 1002 of a first CC (CC 1) schedules CSI-RS transmissions in slot 1. Specifically, the DCI (not shown in FIG. 10) of the PDCCH 1002 schedules a first CSI-RS 1004 (CSI-RS 1) on CC1 and schedules a second CSI-RS 1006 (CSI-RS 2) on CC2.

In addition, the DCI schedules CSI reports in slot 3. Specifically, the DCI schedules a first CSI report 1008 (CSI Report 1) on CC1 and a second CSI report 1010 (CSI Report 2) on CC1. A UE (not shown in FIG. 10) generates the first CSI report 1008 based on the first CSI-RS 1004 and generates the second CSI report 1010 based on the second CSI-RS 1004. The UE then sends the first CSI report 1008 and the second CIS report 1010 via the same CC (CC1 in this example). As discussed above, the UE may send the first CSI report 1008 and the second CSI report 1010 in the same PUSCH and/or PUCCH on a cell. The cell with the PUSCH and/or PUCCH that carries the first CSI report 1008 and the second CSI report 1010 can be indicated by RRC signaling, a MAC-CE, or DCI signaling.

Figure 11:
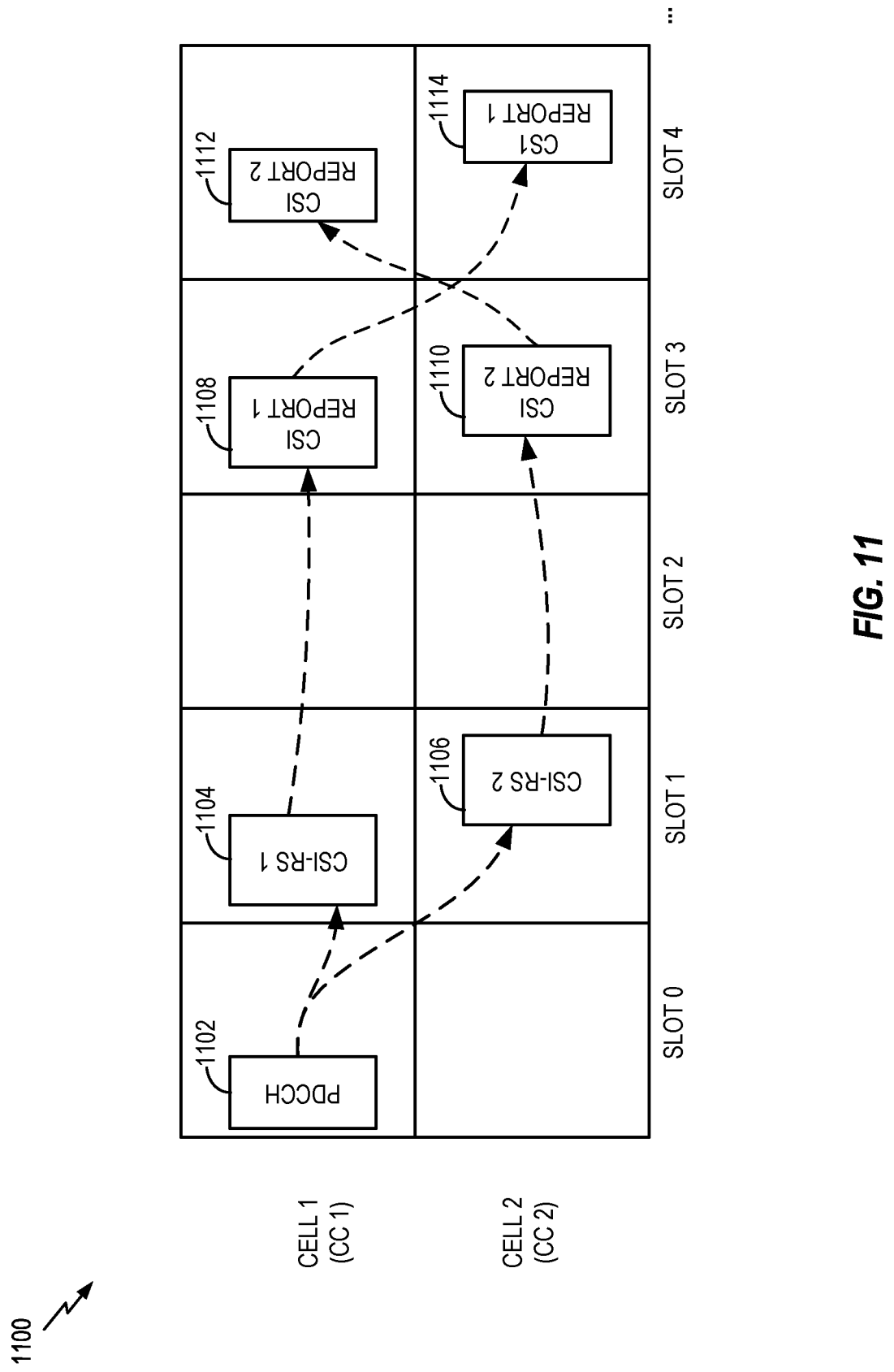
FIG. 11 is a block diagram conceptually illustrating duplication of CSI reports on different carriers in accordance with some aspects of the disclosure.

FIG. 11 illustrates another example of CSI report scheduling 1100 that may be specified by a DCI. In this example, a CSI report scheduled on one CC may also be scheduled on another CC. That is, the CSI report may be duplicated across CCs.

In slot 0, a PDCCH 1102 of a first CC (CC 1) schedules CSI-RS transmissions in slot 1. Specifically, the DCI (not shown in FIG. 11) of the PDCCH 1102 schedules a first CSI-RS 1104 (CSI-RS 1) on CC1 and schedules a second CSI-RS 1106 (CSI-RS 2) on CC2.

In addition, the DCI schedules CSI reports in slots 3 and 4. Specifically, for slot 3, the DCI schedules a first CSI report 1108 (CSI Report 1) on CC1 and a second CSI report 1110 (CSI Report 2) on CC2. In this case, a CSI report is scheduled on the same CC as the corresponding CSI-RS. Thus, a UE (not shown in FIG. 11) generates the first CSI report 1108 based on the first CSI-RS 1104 and generates the second CSI report 1110 based on the second CSI-RS 1104. The UE then sends the first CSI report 1108 via CC1 and sends the second CIS report 1110 via CC2. In addition, for slot 4, the DCI schedules a third CSI report 1112 (CSI Report 2) on CC1 and a fourth CSI report 1114 (CSI Report 1) on CC2. That is, some or all of each CSI is also sent over the other carrier. A gNB that receives the CSI reports may be able to more accurately determine the state of each CC since the CSI reports may be sent with redundancy. Thus, the uplink control information such as CSI report can be transmitted repeatedly on different cells, with the same or different beams, and which cells are to repeat the uplink control information can be configured by RRC signaling. As discussed above, the UE may send the first CSI report 1108 and the second CSI report 1110 in PUSCH or PUCCH.

Figure 12:
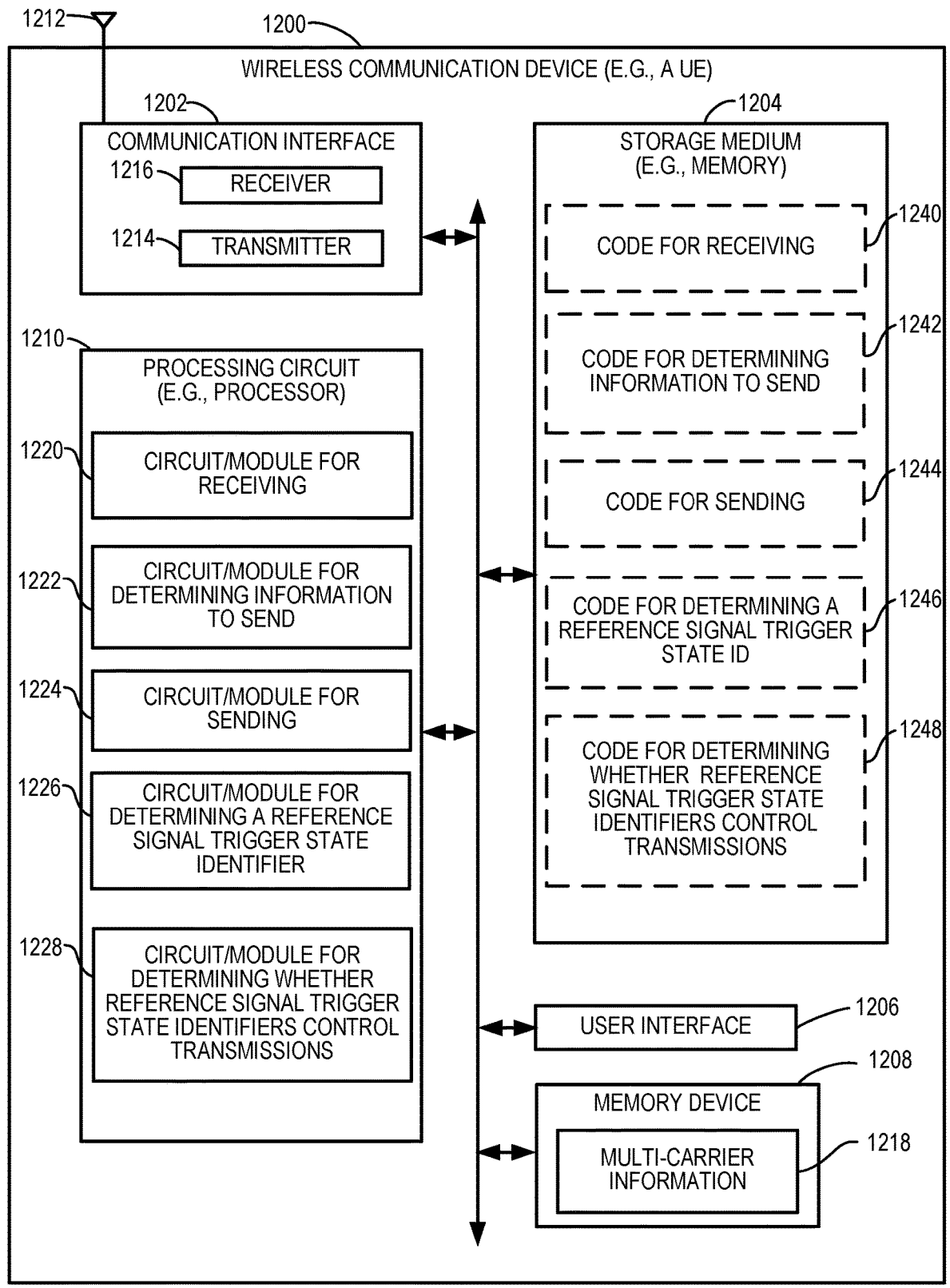
FIG. 12 is a block diagram conceptually illustrating an example hardware implementation of a device for wireless communication in accordance with some aspects of the disclosure.

FIG. 12 illustrates a block diagram of an example hardware implementation of a wireless communication device 1200 configured to communicate according to one or more aspects of the disclosure. The device 1200 could embody or be implemented within a UE, a user terminal, a wireless communication system, a gNB, a transmit receive point (TRP), a base station (BS), an eNode B (eNB), a CPE, or some other type of device that supports wireless communication. In various implementations, the device 1200 could embody or be implemented within an access terminal, an access point, or some other type of device. In various implementations, the device 1200 could embody or be implemented within a server, a personal computer, a mobile phone, a smart phone, a tablet, a portable computer, a sensor, an alarm, a vehicle, a machine, an entertainment device, a medical device, or any other electronic device having circuitry. The device 1200 may correspond at least in some aspect to, for example, the UE 106 of FIG. 1.

The device 1200 includes a communication interface (e.g., at least one transceiver) 1202, a storage medium 1204, a user interface 1206, a memory device (e.g., a memory circuit) 1208, and a processing circuit 1210 (e.g., at least one processor). In various implementations, the user interface 1206 may include one or more of: a keypad, a display, a speaker, a microphone, a touchscreen display, of some other circuitry for receiving an input from or sending an output to a user.

These components can be coupled to and/or placed in electrical communication with one another via a signaling bus or other suitable component, represented generally by the connection lines in FIG. 12. The signaling bus may include any number of interconnecting buses and bridges depending on the specific application of the processing circuit 1210 and the overall design constraints. The signaling bus links together various circuits such that each of the communication interface 1202, the storage medium 1204, the user interface 1206, and the memory device 1208 are coupled to and/or in electrical communication with the processing circuit 1210. The signaling bus may also link various other circuits (not shown) such as timing sources, peripherals, voltage regulators, and power management circuits, which are well known in the art, and therefore, will not be described any further.

The communication interface 1202 provides a means for communicating with other devices over a transmission medium. In some implementations, the communication interface 1202 includes circuitry and/or programming adapted to facilitate the communication of information bi-directionally with respect to one or more communication devices in a network. In some implementations, the communication interface 1202 is adapted to facilitate wireless communication of the device 1200. For example, the communication interface 1202 may include a radio frequency (RF) front end (e.g., an RF transmitter and/or an RF receiver). In these implementations, the communication interface 1202 may be coupled to one or more antennas 1212 as shown in FIG. 12 for wireless communication within a wireless communication system. In some implementations, the communication interface 1202 may be configured to interface the device 1200 to one or more other components (other components not shown in FIG. 12). For example, the communication interface 1202 may be configured to interface the processing circuit 1210 to a radio frequency (RF) front end. In some implementations, the communication interface 1202 may be configured for wire-based communication. For example, the communication interface 1202 could be a bus interface, a send/receive interface, or some other type of signal interface including drivers, buffers, receivers, or other circuitry for outputting and/or obtaining signals (e.g., outputting signal from and/or receiving signals into an integrated circuit). The communication interface 1202 can be configured with one or more standalone receivers and/or transmitters, as well as one or more transceivers. In the illustrated example, the communication interface 1202 includes a transmitter 1214 and a receiver 1216. The communication interface 1202 serves as one example of a means for receiving and/or means transmitting.

The memory device 1208 may represent one or more memory devices. As indicated, the memory device 1208 may maintain multi-carrier information 1218 along with other information used by the device 1200. In some implementations, the memory device 1208 and the storage medium 1204 are implemented as a common memory component. The memory device 1208 may also be used for storing data that is manipulated by the processing circuit 1210 or some other component of the device 1200.

The storage medium 1204 may represent one or more computer-readable, machine-readable, and/or processor-readable devices for storing programming, such as processor executable code or instructions (e.g., software, firmware), electronic data, databases, or other digital information. The storage medium 1204 may also be used for storing data that is manipulated by the processing circuit 1210 when executing programming. The storage medium 1204 may be any available media that can be accessed by a general purpose or special purpose processor, including portable or fixed storage devices, optical storage devices, and various other mediums capable of storing, containing or carrying programming.

By way of example and not limitation, the storage medium 1204 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 1204 may be embodied in an article of manufacture (e.g., a computer program product). By way of example, a computer program product may include a computer-readable medium in packaging materials. In view of the above, in some implementations, the storage medium 1204 may be a non-transitory (e.g., tangible) storage medium. For example, the storage medium 1204 may be a non-transitory computer-readable medium storing computer-executable code, including code to perform operations as described herein.

The storage medium 1204 may be coupled to the processing circuit 1210 such that the processing circuit 1210 can read information from, and write information to, the storage medium 1204. That is, the storage medium 1204 can be coupled to the processing circuit 1210 so that the storage medium 1204 is at least accessible by the processing circuit 1210, including examples where at least one storage medium is integral to the processing circuit 1210 and/or examples where at least one storage medium is separate from the processing circuit 1210 (e.g., resident in the device 1200, external to the device 1200, distributed across multiple entities, etc.).

Programming stored by the storage medium 1204, when executed by the processing circuit 1210, causes the processing circuit 1210 to perform one or more of the various functions and/or process operations described herein. For example, the storage medium 1204 may include operations configured for regulating operations at one or more hardware blocks of the processing circuit 1210, as well as to utilize the communication interface 1202 for wireless communication utilizing their respective communication protocols.

The processing circuit 1210 is generally adapted for processing, including the execution of such programming stored on the storage medium 1204. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 1210 is arranged to obtain, process and/or send data, control data access and storage, issue commands, and control other desired operations. The processing circuit 1210 may include circuitry configured to implement desired programming provided by appropriate media in at least one example. For example, the processing circuit 1210 may be implemented as one or more processors, one or more controllers, and/or other structure configured to execute executable programming Examples of the processing circuit 1210 may include a general purpose processor, a digital signal processor (DSP), an application-specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1210 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 1210 are for illustration and other suitable configurations within the scope of the disclosure are also contemplated.

According to one or more aspects of the disclosure, the processing circuit 1210 may be adapted to perform any or all of the features, processes, functions, operations and/or routines for any or all of the devices described herein. For example, the processing circuit 1210 may be configured to perform any of the steps, functions, and/or processes described with respect to FIGS. 1-9 and 13. As used herein, the term "adapted" in relation to the processing circuit 1210 may refer to the processing circuit 1210 being one or more of configured, employed, implemented, and/or programmed to perform a particular process, function, operation and/or routine according to various features described herein.

The processing circuit 1210 may be a specialized processor, such as an application-specific integrated circuit (ASIC) that serves as a means for (e.g., structure for) carrying out any one of the operations described in conjunction with FIGS. 1-9 and 13. The processing circuit 1210 serves as one example of a means for transmitting and/or a means for receiving. In various implementations, the processing circuit 1210 may provide and/or incorporate, at least in part, the functionality described above for the second device 404 (e.g., the communication controller 410) of FIG. 4.

According to at least one example of the device 1200, the processing circuit 1210 may include one or more of a circuit/module for receiving 1220, a circuit/module for determining information to send 1222, a circuit/module for sending 1224, a circuit/module for determining a reference signal trigger state identifier 1226, or a circuit/module for determining whether reference signal trigger state identifiers control transmissions 1228. In various implementations, the circuit/module for receiving 1220, the circuit/module for determining information to send 1222, the circuit/module for sending 1224, the circuit/module for determining a reference signal trigger state identifier 1226, or the circuit/module for determining whether reference signal trigger state identifiers control transmissions 1228 may provide and/or incorporate, at least in part, the functionality described above for the second device 404 (e.g., the communication controller 410) of FIG. 4.

As mentioned above, programming stored by the storage medium 1204, when executed by the processing circuit 1210, causes the processing circuit 1210 to perform one or more of the various functions and/or process operations described herein. For example, the programming may cause the processing circuit 1210 to perform the various functions, steps, and/or processes described herein with respect to FIGS. 1-9 and 13 in various implementations. As shown in FIG. 12, the storage medium 1204 may include one or more of code for receiving 1240, code for determining information to send 1242, code for sending 1244, code for determining a reference signal trigger state identifier 1246, or code for determining whether reference signal trigger state identifiers control transmissions 1248. In various implementations, the code for receiving 1240, the code for determining information to send 1242, the code for sending 1244, the code for determining a reference signal trigger state identifier 1246, or the code for determining whether reference signal trigger state identifiers control transmissions 1248 may be executed or otherwise used to provide the functionality described herein for the circuit/module for receiving 1220, the circuit/module for determining information to send 1222, the circuit/module for sending 1224, the circuit/module for determining a reference signal trigger state identifier 1226, or the circuit/module for determining whether reference signal trigger state identifiers control transmissions 1228.

Figure 13:
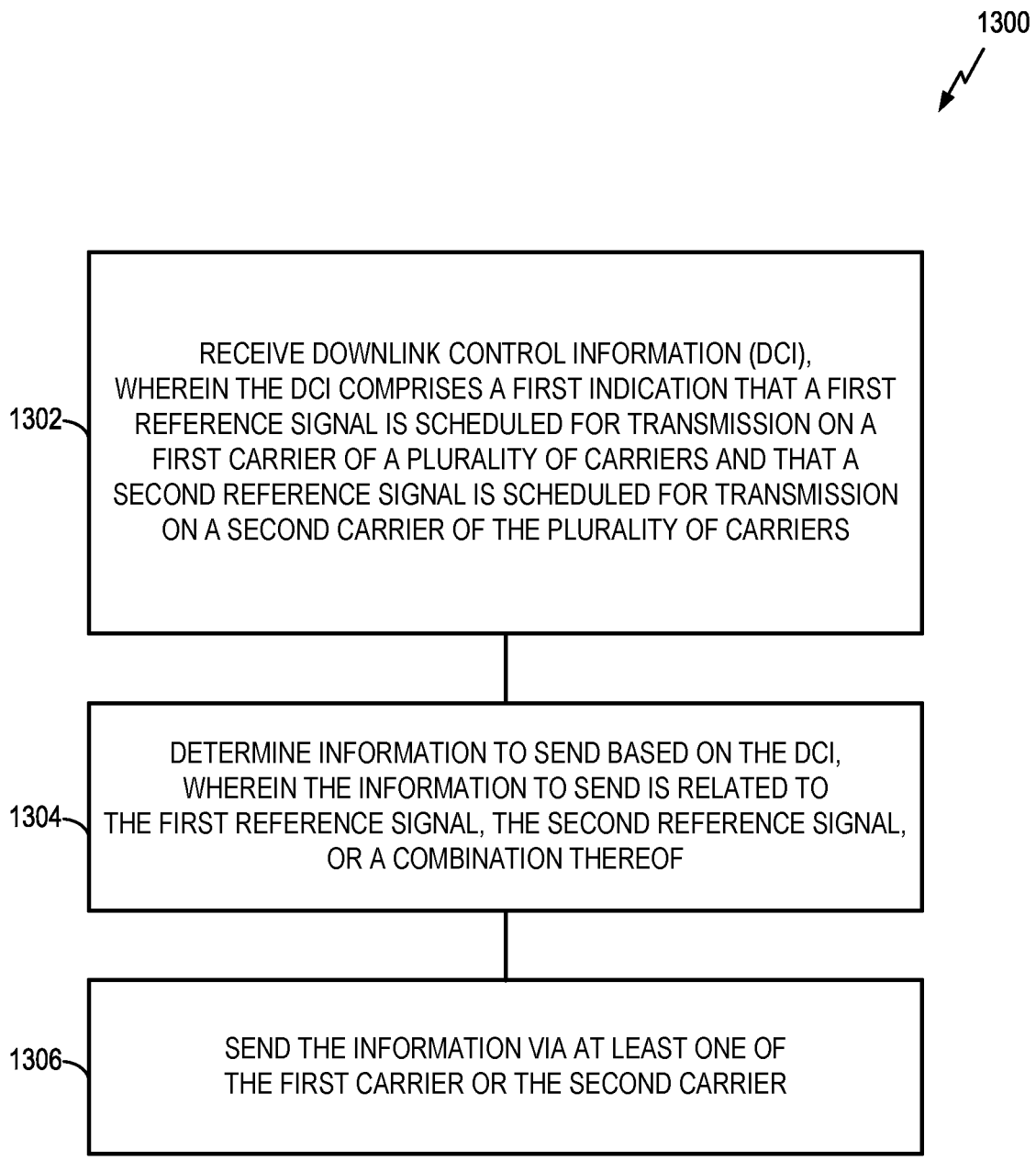
FIG. 13 is a flowchart illustrating an example of a process for communicating reference signals on multiple carriers in accordance with some aspects of the disclosure.

FIG. 13 illustrates a process 1300 for communication in accordance with some aspects of the disclosure. The process 1300 may take place within a processing circuit (e.g., the processing circuit 1210 of FIG. 12), which may be located in a wireless communication device, a UE, a gNB, a TRP, a BS, an eNB, a CPE, or some other suitable device. Of course, in various aspects within the scope of the disclosure, the process 1300 may be implemented by any suitable device capable of supporting communication-related operations.

At block 1302, a wireless communication device (e.g., a UE) receives downlink control information (DCI), wherein the DCI comprises a first indication that a first reference signal is scheduled for transmission on a first carrier of a plurality of carriers and that a second reference signal is scheduled for transmission on a second carrier of the plurality of carriers. In some aspects, the DCI may schedule the plurality of carriers.

At block 1304, the device determines information to send based on the DCI, wherein the information to send is related to the first reference signal, the second reference signal, or a combination thereof. For example, the device may determine (e.g., generate) a CSI report to send to a base station based on a scheduled CSI-RS indicated by the DCI. As another example, the device may determine that it is scheduled to send an SRS in response to the DCI indicating that an SRS is scheduled. As yet another example, the device may determine (e.g., generate) an SRS to send to a base station in response to the DCI indicating that an SRS is scheduled.

At block 1306, the device sends the information via at least one of the first carrier or the second carrier.

In some aspects, the first reference signal may include a channel state information reference signal (CSI-RS); and the sending of the information may include sending uplink control information via the first carrier and the second carrier based on the first reference signal. In some aspects, the uplink control information may include at least one channel state information report.

In some aspects, the first reference signal may include a first channel state information reference signal (CSI-RS); the second reference signal may include a second channel state information reference signal (CSI-RS); and the sending of the information may include sending uplink control information via the first carrier and the second carrier based on the first reference signal and the second reference signal.

In some aspects, the first reference signal may include a channel state information reference signal (CSI-RS); the second reference signal may include a sounding reference signal (SRS); and the process may include sending the SRS via the second carrier according to the first indication.

In some aspects, the transmissions on the plurality of carriers may include: a first physical uplink control channel (PUCCH) transmission on the first carrier; and a second physical uplink control channel (PUCCH) transmission on the second carrier.

In some aspects, the DCI may include a component carrier index.

In some aspects, the DCI may include a second indication of the first carrier and a reference signal trigger state identifier associated with the first carrier; and the process 1300 may further include sending or receiving the first reference signal according to the reference signal trigger state identifier.

In some aspects, the DCI may include a second indication of a reference signal trigger state identifier that is mapped to a first reference signal trigger state identifier for the first carrier and a second reference signal trigger state identifier for the second carrier. In some aspects, the process 1300 may further include sending or receiving the first reference signal according to the first reference signal trigger state identifier. In some aspects, the method may include sending or receiving the second reference signal according to the second reference signal trigger state identifier.

In some aspects, the process 1300 may further include receiving a mapping between a particular reference signal trigger state identifier and a plurality of reference signal trigger state identifiers. In some aspects, the DCI may include a second indication of the particular reference signal trigger state identifier. In some aspects, the process 1300 may further include determining, based on the mapping, a first reference signal trigger state identifier for the first carrier and a second reference signal trigger state identifier for the second carrier. In some aspects, the mapping is received via a radio resource control (RRC) message, a media access control-control element (MAC-CE), or downlink control information (DCI).

In some aspects, the process 1300 may further include: receiving a first mapping between a first reference signal trigger state identifier and first plurality of reference signal trigger state identifiers; receiving a second mapping between a second reference signal trigger state identifier and second plurality of reference signal trigger state identifiers, wherein the second reference signal trigger state identifier is different from the first reference signal trigger state identifier, and wherein the second plurality of reference signal trigger state identifiers is different from the first plurality of reference signal trigger state identifiers; and determining, based on the first mapping and the second mapping, whether the first plurality of reference signal trigger state identifiers or the second plurality of reference signal trigger state identifiers control the transmission of the first reference signal and the transmission of the second reference signal.

In some aspects, the DCI may include a second indication of at least one of the plurality of carriers to be used for reporting channel state information based on the first reference signal, the second reference signal, or a combination thereof. In some aspects, the process 1300 may further include sending a channel state information report based on the channel state information according to the second indication.

In some aspects, the DCI may include a second indication that channel state information based on the first reference signal is to be reported via the first carrier. In some aspects, the process 1300 may further include sending a channel state information report based on the channel state information via the first carrier according to the second indication.

In some aspects, the DCI may include a second indication that first channel state information based on the first reference signal and second channel state information based on the second reference signal are to be reported via the first carrier. In some aspects, the process 1300 may further include sending a channel state information report including the first channel state information and the second channel state information via the first carrier according to the second indication.

In some aspects, the DCI may include a second indication that channel state information based on the first reference signal is to be reported via the first carrier and the second carrier. In some aspects, the process 1300 may further include sending a channel state information report based on the channel state information via the first carrier and the second carrier according to the second indication.

In some aspects, the DCI may include a second indication that channel state information based on the first reference signal is to be reported via the first carrier using a first redundancy version and via the second carrier using a second redundancy version. In some aspects, the process 1300 may further include sending a first channel state information report based on the channel state information via the first carrier, wherein the first channel state information report is based on the first redundancy version according to the second indication. In some aspects, the process 1300 may further include sending a second channel state information report based on the channel state information via the second carrier, wherein the second channel state information report is based on the second redundancy version according to the second indication.

In some aspects, the DCI may include a second indication that channel state information based on the first reference signal is to be reported via the first carrier using a first beam and via the second carrier using a second beam. In some aspects, the process 1300 may further include sending a first channel state information report based on the channel state information via the first carrier using the first beam according to the second indication. In some aspects, the process 1300 may further include sending a second channel state information report based on the channel state information via the second carrier using the second beam according to the second indication.

In some aspects, a process in accordance with various aspects of the disclosure may include any combination of the above operations.

Figure 14:
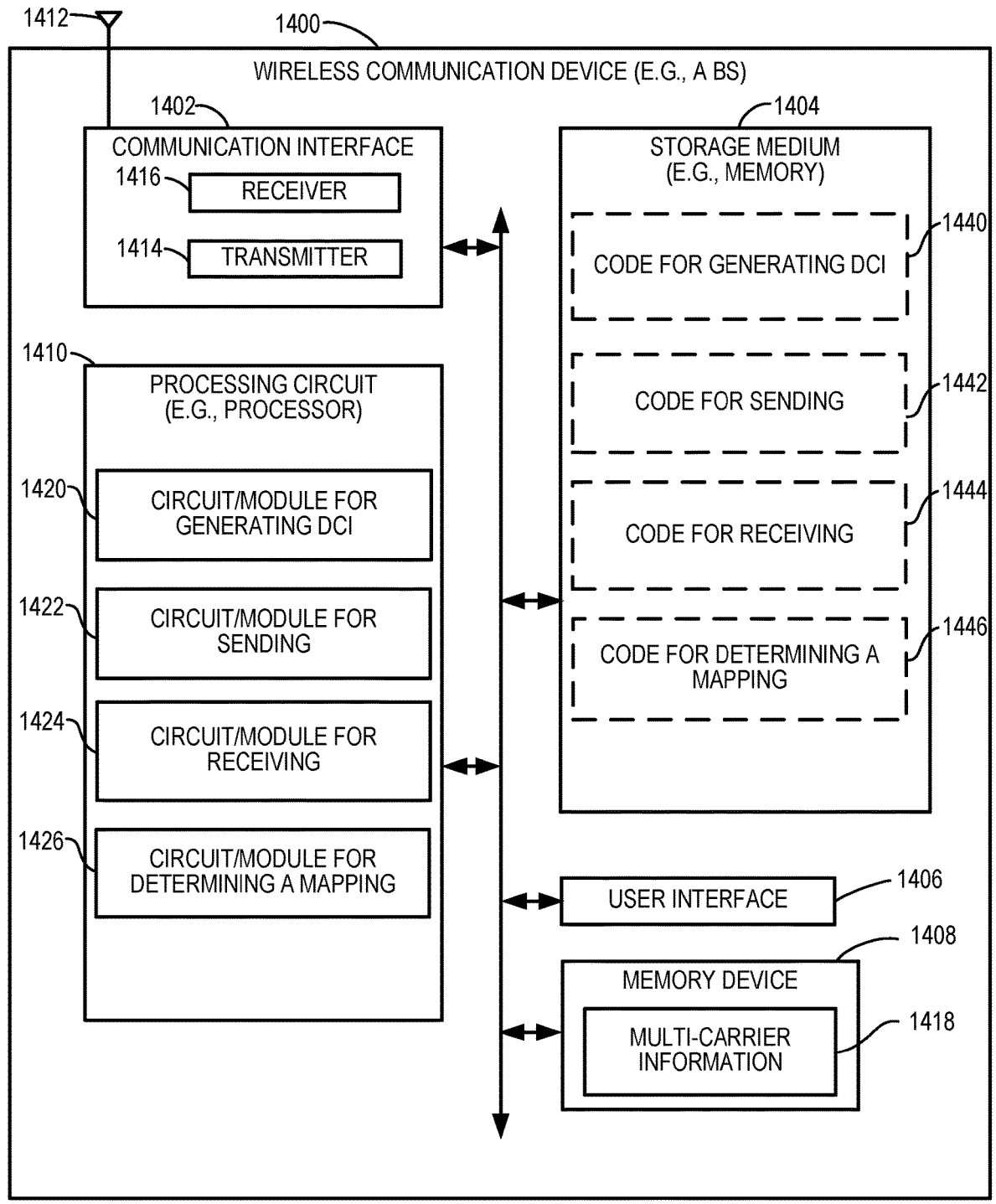
FIG. 14 is a block diagram conceptually illustrating an example hardware implementation of another device for wireless communication in accordance with some aspects of the disclosure.

FIG. 14 illustrates a block diagram of an example hardware implementation of a wireless communication device 1400 configured to communicate according to one or more aspects of the disclosure. The device 1400 could embody or be implemented within a gNB, a transmit receive point (TRP), a base station (BS), an eNode B (eNB), a CPE, or some other type of device that supports wireless communication. In various implementations, the device 1400 could embody or be implemented within an access terminal, an access point, or some other type of device. In various implementations, the device 1400 could embody or be implemented within a server, a personal computer, a mobile phone, a smart phone, a tablet, a portable computer, a sensor, an alarm, a vehicle, a machine, an entertainment device, a medical device, or any other electronic device having circuitry. The device 1400 may correspond at least in some aspect to, for example, a base station 108 of FIG. 1.

The device 1400 includes a communication interface 1402 (e.g., at least one transceiver), a storage medium 1404, a user interface 1406, a memory device 1408 (e.g., storing multi-carrier information 1418), and a processing circuit 1410 (e.g., at least one processor). In various implementations, the user interface 1406 may include one or more of: a keypad, a display, a speaker, a microphone, a touchscreen display, of some other circuitry for receiving an input from or sending an output to a user. The communication interface 1402 may be coupled to one or more antennas 1412, and may include a transmitter 1414 and a receiver 1416. In general, the components of FIG. 14 may be similar to corresponding components of the device 1200 of FIG. 12.

According to one or more aspects of the disclosure, the processing circuit 1410 may be adapted to perform any or all of the features, processes, functions, operations and/or routines for any or all of the devices described herein. For example, the processing circuit 1410 may be configured to perform any of the steps, functions, and/or processes described with respect to FIGS. 1-9 and 15. As used herein, the term "adapted" in relation to the processing circuit 1410 may refer to the processing circuit 1410 being one or more of configured, used, implemented, and/or programmed to perform a particular process, function, operation and/or routine according to various features described herein.

The processing circuit 1410 may be a specialized processor, such as an application specific integrated circuit (ASIC) that serves as a means for (e.g., structure for) carrying out any one of the operations described in conjunction with FIGS. 1-9 and 15. The processing circuit 1410 may serve as one example of a means for transmitting and/or a means for receiving. In various implementations, the processing circuit 1410 may provide and/or incorporate, at least in part, the functionality described above for the first device 402 (e.g., the communication controller 406) of FIG. 4.

According to at least one example of the device 1400, the processing circuit 1410 may include one or more of a circuit/module for generating DCI 1420, a circuit/module for sending 1422, a circuit/module for receiving 1424, or a circuit/module for determining a mapping 1426. In various implementations, the circuit/module for generating DCI 1420, the circuit/module for sending 1422, the circuit/module for receiving 1424, or the circuit/module for determining a mapping 1426 may provide and/or incorporate, at least in part, the functionality described above for the first device 402 (e.g., the communication controller 406) of FIG. 4.

As mentioned above, programming stored by the storage medium 1404, when executed by the processing circuit 1410, causes the processing circuit 1410 to perform one or more of the various functions and/or process operations described herein. For example, the programming may cause the processing circuit 1410 to perform the various functions, steps, and/or processes described herein with respect to FIGS. 1-9 and 15 in various implementations. As shown in FIG. 14, the storage medium 1404 may include one or more of code for generating DCI 1440, code for sending 1442, code for receiving 1444, or code for determining a mapping 1446. In various implementations, the code for generating DCI 1440, the code for sending 1442, the code for receiving 1444, or the code for determining a mapping 1446 may be executed or otherwise used to provide the functionality described herein for the circuit/module for generating DCI 1420, the circuit/module for sending 1422, the circuit/module for receiving 1424, or the circuit/module for determining a mapping 1426.

Figure 15:
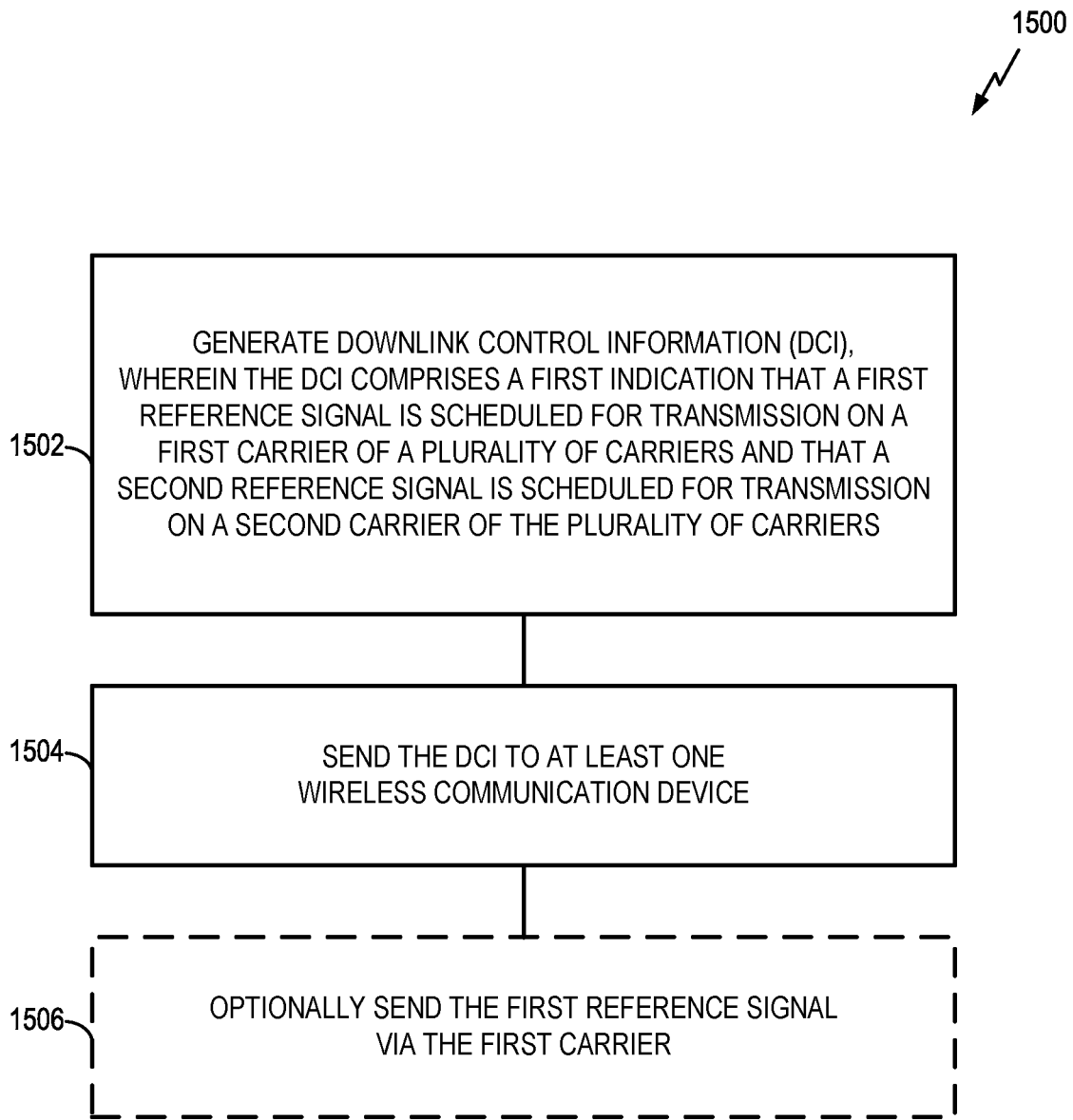
FIG. 15 is a flowchart illustrating an example of a process for providing downlink control information in accordance with some aspects of the disclosure.

FIG. 15 illustrates a process 1500 for communication in accordance with some aspects of the disclosure. The process 1500 may take place within a processing circuit (e.g., the processing circuit 1410 of FIG. 14), which may be located in a base station, a wireless communication device, a gNB, a TRP, a BS, an eNB, a CPE, or some other suitable device. Of course, in various aspects within the scope of the disclosure, the process 1500 may be implemented by any suitable device capable of supporting communication-related operations.

At block 1502, a wireless communication device (e.g., a base station) generates downlink control information (DCI), wherein the DCI comprises a first indication that a first reference signal is scheduled for transmission on a first carrier of a plurality of carriers and that a second reference signal is scheduled for transmission on a second carrier of the plurality of carriers. In some aspects, the DCI may schedule the plurality of carriers.

At block 1504, the device sends the DCI to at least one wireless communication device (e.g., a UE).

At optional block 1506, the device may send the first reference signal via the first carrier.

In some aspects, the first reference signal may include a channel state information reference signal (CSI-RS); and the second reference signal may include a sounding reference signal (SRS). In some aspects, the process 1500 may further include: sending the first reference signal via the first carrier; and receiving the second reference signal via the second carrier.

In some aspects, the first reference signal may include a first channel state information reference signal (CSI-RS); and the second reference signal may include a second channel state information reference signal (CSI-RS). In some aspects, the process 1500 may further include: sending the first reference signal via the first carrier; and sending the second reference signal via the second carrier.

In some aspects, the transmissions on the plurality of carriers may include: a first physical uplink control channel (PUCCH) transmission on the first carrier; and a second physical uplink control channel (PUCCH) transmission on the second carrier. In some aspects, the process 1500 may further include: receiving the first physical uplink control channel (PUCCH) transmission via the first carrier, the second physical uplink control channel (PUCCH) transmission via the second carrier, or a combination thereof.

In some aspects, the DCI may include a component carrier index.

In some aspects, the DCI may include a second indication of the first carrier and a reference signal trigger state identifier associated with the first carrier. In some aspects, the process 1500 may further include sending or receiving the first reference signal according to the reference signal trigger state identifier.

In some aspects, the DCI may include a second indication of a reference signal trigger state identifier that is mapped to a first reference signal trigger state identifier for the first carrier and a second reference signal trigger state identifier for the second carrier. In some aspects, the process 1500 may further include sending or receiving the first reference signal according to the first reference signal trigger state identifier; and In some aspects, the process 1500 may further include sending or receiving the second reference signal according to the second reference signal trigger state identifier.

In some aspects, the process 1500 may further include: determining a mapping between a first reference signal trigger state identifier and plurality of reference signal trigger state identifiers; and sending the mapping to the at least one wireless communication device.

In some aspects, the mapping may be sent via a radio resource control (RRC) message, a media access control-control element (MAC-CE), or downlink control information (DCI).

In some aspects, the process 1500 may further include: determining a first mapping between a first reference signal trigger state identifier and first plurality of reference signal trigger state identifiers; determining a second mapping between a second reference signal trigger state identifier and second plurality of reference signal trigger state identifiers, wherein the second reference signal trigger state identifier is different from the first reference signal trigger state identifier, and wherein the second plurality of reference signal trigger state identifiers is different from the first plurality of reference signal trigger state identifiers; and sending the first mapping and the second mapping to the at least one wireless communication device.

In some aspects, the DCI may include a second indication of at least one of the plurality of carriers to be used for reporting channel state information based on the first reference signal, the second reference signal, or a combination thereof. In some aspects, the process 1500 may further include receiving a channel state information report including the channel state information via the at least one of the plurality of carriers according to the second indication.

In some aspects, the DCI may include a second indication that channel state information based on the first reference signal is to be reported via the first carrier. In some aspects, the process 1500 may further include receiving a channel state information report that may include the channel state information via the first carrier according to the second indication.

In some aspects, the DCI may include a second indication that first channel state information based on the first reference signal and second channel state information based on the second reference signal are to be reported via the first carrier. In some aspects, the process 1500 may further include receiving a channel state information report that may include the first channel state information and the second channel state information via the first carrier according to the second indication.

In some aspects, the DCI may include a second indication that channel state information based on the first reference signal is to be reported via the first carrier and the second carrier. In some aspects, the process 1500 may further include receiving a channel state information report that may include the channel state information via the first carrier and the second carrier according to the second indication.

In some aspects, the DCI may include a second indication that channel state information based on the first reference signal is to be reported via the first carrier using a first redundancy version and via the second carrier using a second redundancy version. In some aspects, the process 1500 may further include receiving a first channel state information report based on the first redundancy version via the first carrier according to the second indication. In some aspects, the process 1500 may further include receiving a second channel state information report based on the second redundancy version via the second carrier according to the second indication.

In some aspects, the DCI may include a second indication that channel state information based on the first reference signal is to be reported via the first carrier using a first beam and via the second carrier using a second beam. In some aspects, the process 1500 may further include receiving a first channel state information report via the first carrier using a first beam according to the second indication. In some aspects, the process 1500 may further include receiving a second channel state information report via the second carrier using a second beam according to the second indication.

In some aspects, a process in accordance with various aspects of the disclosure may include any combination of the above operations.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as LTE, the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing Institute of Electrical and Electronics Engineers (IEEE) 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-15 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in any of FIG. 1-4, 12, or 14 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of communication at a wireless communication device, comprising:
   receiving downlink control information (DCI), wherein the DCI comprises a first is configured to schedule a first reference signal for transmission on a first carrier of a plurality of carriers and further configured to schedule a second reference signal for transmission on a second carrier of the plurality of carriers; and transmitting information via at least one of the first carrier or the second carrier, the information being based on the DCI and being related to the first reference signal, the second reference signal, or a combination thereof.

2. A wireless communication device, comprising:
one or more memories that store processor-executable code; and
one or more processors configured to execute the processor-executable code and cause the wireless communication device to:
receive downlink control information (DCI), wherein the DCI is configured to schedule a first reference signal for transmission on a first carrier of a plurality of carriers and further configured to schedule a second reference signal for transmission on a second carrier of the plurality of carriers; and
transmit information via at least one of the first carrier or the second carrier, the information being based on the DCI and being related to the first reference signal, the second reference signal, or a combination thereof.

3. The wireless communication device of claim 2, wherein:
the first reference signal comprises a channel state information reference signal (CSI-RS); and
the transmission of the information comprises a transmission of uplink control information via the first carrier and the second carrier based on the first reference signal.

4. The wireless communication device of claim 2, wherein:
the first reference signal comprises a first channel state information reference signal (CSI-RS);
the second reference signal comprises a second channel state information reference signal (CSI-RS); and
the transmission of the information comprises a transmission of uplink control information via the first carrier and the second carrier based on the first reference signal and the second reference signal.

5. The wireless communication device of claim 2, wherein:
the first reference signal comprises a channel state information reference signal (CSI-RS);
the second reference signal comprises a sounding reference signal (SRS); and
the one or more processors are further configured to execute the processor-executable code and cause the wireless communication device to transmit the SRS via the second carrier according to DCI.

6. The wireless communication device of claim 2, wherein the DCI further comprises a component carrier index.

7. The wireless communication device of claim 2, wherein:
the DCI further comprises a second indication of the first carrier and a reference signal trigger state identifier associated with the first carrier; and
the one or more processors are further configured to execute the processor-executable code and cause the wireless communication device to transmit or receive the first reference signal according to the reference signal trigger state identifier.

8. The wireless communication device of claim 2, wherein:

the DCI further comprises a second indication of a reference signal trigger state identifier that is mapped to a first reference signal trigger state identifier for the first carrier and a second reference signal trigger state identifier for the second carrier;
the one or more processors are further configured to execute the processor-executable code and cause the wireless communication device to transmit or receive the first reference signal according to the first reference signal trigger state identifier; and
the one or more processors are further configured to execute the processor-executable code and cause the wireless communication device to transmit or receive the second reference signal according to the second reference signal trigger state identifier.

9. The wireless communication device of claim 2, wherein:
the one or more processors are further configured to execute the processor-executable code and cause the wireless communication device to receive a mapping between a particular reference signal trigger state identifier and a plurality of reference signal trigger state identifiers;
the DCI further comprises a second indication of the particular reference signal trigger state identifier; and
the one or more processors are further configured to execute the processor-executable code and cause the wireless communication device to transmit identify, based on the mapping, a first reference signal trigger state identifier for the first carrier and a second reference signal trigger state identifier for the second carrier.

10. The wireless communication device of claim 2, wherein the one or more processors are further configured to execute the processor-executable code and cause the wireless communication device to:
receive a first mapping between a first reference signal trigger state identifier and first plurality of reference signal trigger state identifiers;
receive a second mapping between a second reference signal trigger state identifier and second plurality of reference signal trigger state identifiers, wherein the second reference signal trigger state identifier is different from the first reference signal trigger state identifier, and wherein the second plurality of reference signal trigger state identifiers is different from the first plurality of reference signal trigger state identifiers; and
determine, based on the first mapping and the second mapping, whether the first plurality of reference signal trigger state identifiers or the second plurality of reference signal trigger state identifiers control the transmission of the first reference signal and the transmission of the second reference signal.

11. The wireless communication device of claim 2, wherein:
the DCI further comprises a second indication of at least one of the plurality of carriers to be used for reporting channel state information based on the first reference signal, the second reference signal, or a combination thereof; and
the one or more processors are further configured to execute the processor-executable code and cause the wireless communication device to transmit a channel state information report based on the channel state information according to the second indication.

12. The wireless communication device of claim 2, wherein:

the DCI further comprises a second indication that channel state information based on the first reference signal is to be reported via the first carrier; and
the one or more processors are further configured to execute the processor-executable code and cause the wireless communication device to transmit a channel state information report based on the channel state information via the first carrier according to the second indication.

13. The wireless communication device of claim 2, wherein:
the DCI further comprises a second indication that first channel state information based on the first reference signal and second channel state information based on the second reference signal are to be reported via the first carrier; and
the one or more processors are further configured to execute the processor-executable code and cause the wireless communication device to transmit a channel state information report comprising the first channel state information and the second channel state information via the first carrier according to the second indication.

14. The wireless communication device of claim 2, wherein:
the DCI further comprises a second indication that channel state information based on the first reference signal is to be reported via the first carrier and the second carrier; and
the one or more processors are further configured to execute the processor-executable code and cause the wireless communication device to transmit a channel state information report based on the channel state information via the first carrier and the second carrier according to the second indication.

15. A method of communication at a network entity, comprising:
transmitting downlink control information (DCI), wherein the DCI is configured to schedule a first reference signal is for transmission on a first carrier of a plurality of carriers and that further configured to schedule a second reference signal for transmission on a second carrier of the plurality of carriers; and
receiving information via at least one of the first carrier or the second carrier, the information being based on the DCI and being related to the first reference signal, the second reference signal, or a combination thereof.

16. A network entity, comprising:
one or more memories that store processor-executable code; and
one or more processors configured to execute the processor-executable code and cause the network entity to:
transmit downlink control information (DCI), wherein the DCI is configured to schedule a first reference signal for transmission on a first carrier of a plurality of carriers and further configured to schedule a second reference signal for transmission on a second carrier of the plurality of carriers; and
receive information via at least one of the first carrier or the second carrier, the information being based on the DCI and being related to the first reference signal, the second reference signal, or a combination thereof.

17. The network entity of claim 16, wherein:
the first reference signal comprises a channel state information reference signal (CSI-RS); and
the second reference signal comprises a sounding reference signal (SRS).

18. The network entity of claim 17, wherein the processor and the memory are further configured to one or more processors are further configured to execute the processor-executable code and cause the network entity to:
transmit the first reference signal via the first carrier; and
receive the second reference signal via the second carrier.

19. The base station network entity of claim 16, wherein:
the first reference signal comprises a first channel state information reference signal (CSI-RS); and
the second reference signal comprises a second channel state information reference signal (CSI-RS).

20. The network entity of claim 19, wherein the one or more processors are further configured to execute the processor-executable code and cause the network entity to:
transmit the first reference signal via the first carrier; and
send transmit the second reference signal via the second carrier.

21. The network entity of claim 16, wherein the one or more processors are further configured to execute the processor-executable code and cause the network entity to:
receive the first physical uplink control channel (PUCCH) transmission via the first carrier, the second physical uplink control channel (PUCCH) transmission via the second carrier, or a combination thereof.

22. The network entity of claim 16, wherein the one or more processors are further configured to execute the processor-executable code and cause the network entity to:
determine a mapping between a first reference signal trigger state identifier and plurality of reference signal trigger state identifiers; and
transmit the mapping to at least one wireless communication device.

23. The network entity of claim 16, wherein the DCI further comprises a second indication of at least one of the plurality of carriers to be used for reporting channel state information based on the first reference signal, the second reference signal, or a combination thereof.

24. The network entity of claim 23, wherein the one or more processors are further configured to execute the processor-executable code and cause the network entity to:
receive a channel state information report comprising the channel state information via the at least one of the plurality of carriers according to the second indication.

25. The network entity of claim 16, wherein the DCI further comprises a second indication that channel state information based on the first reference signal is to be reported via the first carrier.

26. The network entity of claim 25, wherein the one or more processors are further configured to execute the processor-executable code and cause the network entity to:
receive a channel state information report comprising the channel state information via the first carrier according to the second indication.

27. The network entity of claim 16, wherein the DCI further comprises a second indication that first channel state information based on the first reference signal and second channel state information based on the second reference signal are to be reported via the first carrier.

28. The network entity of claim 27, wherein the one or more processors are further configured to execute the processor-executable code and cause the network entity to:
receive a channel state information report comprising the first channel state information and the second channel state information via the first carrier according to the second indication.

29. The network entity of claim 16, wherein the DCI further comprises a second indication that channel state information based on the first reference signal is to be reported via the first carrier and the second carrier.

30. The network entity of claim 29, wherein the one or more processors are further configured to execute the processor-executable code and cause the network entity to:
receive a channel state information report comprising the channel state information via the first carrier and the second carrier according to the second indication.

\* \* \* \* \*